United States Patent
Schuster

(10) Patent No.: US 9,273,455 B2
(45) Date of Patent: Mar. 1, 2016

(54) CLOSET COLLAR ADAPTATIONS

(71) Applicant: Danco, Inc., Irving, TX (US)

(72) Inventor: Michael J. Schuster, Shorewood, IL (US)

(73) Assignee: Danco, Inc., Irving, TX (US)

( * ) Notice: Subject to any disclaimer, the term of this patent is extended or adjusted under 35 U.S.C. 154(b) by 0 days.

(21) Appl. No.: 14/488,804

(22) Filed: Sep. 17, 2014

(65) Prior Publication Data

US 2015/0000021 A1 Jan. 1, 2015

Related U.S. Application Data

(63) Continuation of application No. 13/771,773, filed on Feb. 20, 2013.

(60) Provisional application No. 61/600,794, filed on Feb. 20, 2012, provisional application No. 61/667,377, filed on Jul. 2, 2012.

(51) Int. Cl.
- *E03D 1/00* (2006.01)
- *E03D 11/16* (2006.01)
- *E03D 11/17* (2006.01)

(52) U.S. Cl.
CPC ............... *E03D 11/16* (2013.01); *E03D 11/17* (2013.01); *Y10T 29/49826* (2015.01)

(58) Field of Classification Search
CPC .................................. E03D 11/16; E03D 11/17
USPC ........................................ 4/300, 252.4–252.6
See application file for complete search history.

(56) References Cited

U.S. PATENT DOCUMENTS

| | | |
|---|---|---|
| 1,333,368 A | 3/1920 | Auer |
| 2,750,216 A | 12/1953 | Thies |
| 2,908,513 A | 10/1956 | Karlinski |
| 3,224,014 A | 12/1965 | Pietrzak |
| 3,400,411 A | 9/1968 | Harvey |
| 3,821,820 A | 7/1974 | Thompson |
| 4,406,480 A | 9/1983 | Izzi |
| 4,482,161 A | 11/1984 | Izzi, Sr. |
| 5,018,224 A | 5/1991 | Hodges |
| 5,185,890 A | 2/1993 | Dismore |
| 5,219,619 A | 6/1993 | Trouve et al. |
| 5,377,361 A | 1/1995 | Piskula |
| 5,432,957 A | 7/1995 | Fernie et al. |
| 6,694,537 B2 | 2/2004 | Telles |

(Continued)

FOREIGN PATENT DOCUMENTS

| | | |
|---|---|---|
| JP | 7331726 | 12/1995 |
| JP | 2010007286 | 1/2010 |

OTHER PUBLICATIONS

U.S. Appl. No. 09/904,058, filed Jul. 11, 2011, now U.S. Pat. No. 6,694,537.

(Continued)

*Primary Examiner* — Huyen Le
(74) *Attorney, Agent, or Firm* — Thomas Horstemeyer, LLP

(57) ABSTRACT

Disclosed are various embodiments for providing a seal for a closet collar. A sealing assembly is positioned on a closet collar for a drain pipe. The sealing assembly may comprise a portion on which a sealing component is positioned. A toilet is positioned over the sealing assembly. The sealing assembly is compressed between the toilet and the closet collar, and a seal for the closet collar is formed.

15 Claims, 47 Drawing Sheets

(56) References Cited

U.S. PATENT DOCUMENTS

| | | |
|---|---|---|
| 6,745,408 B2 | 6/2004 | Spells, Sr. |
| 6,883,187 B2 | 4/2005 | Cornwall |
| 7,069,603 B2 | 7/2006 | Flushing |
| D574,931 S | 8/2008 | Hughes |
| 8,099,801 B2 | 1/2012 | Hughes |
| 2003/0009820 A1 | 1/2003 | Telles |
| 2003/0126676 A1 | 7/2003 | Gallacher et al. |
| 2005/0108814 A1 | 5/2005 | Thompson |
| 2007/0256220 A1 | 11/2007 | Lee et al. |
| 2011/0094024 A1 | 4/2011 | Grech et al. |
| 2011/0185487 A1 | 8/2011 | Miller |
| 2011/0185488 A1 | 8/2011 | Miller |

OTHER PUBLICATIONS

Non-Final Office Action mailed in related U.S. Appl. No. 14/693,472, mailed Jul. 20, 2015.

Non-final Office Action in related U.S. Appl. No. 13/974,918 mailed Jun. 12, 2015.

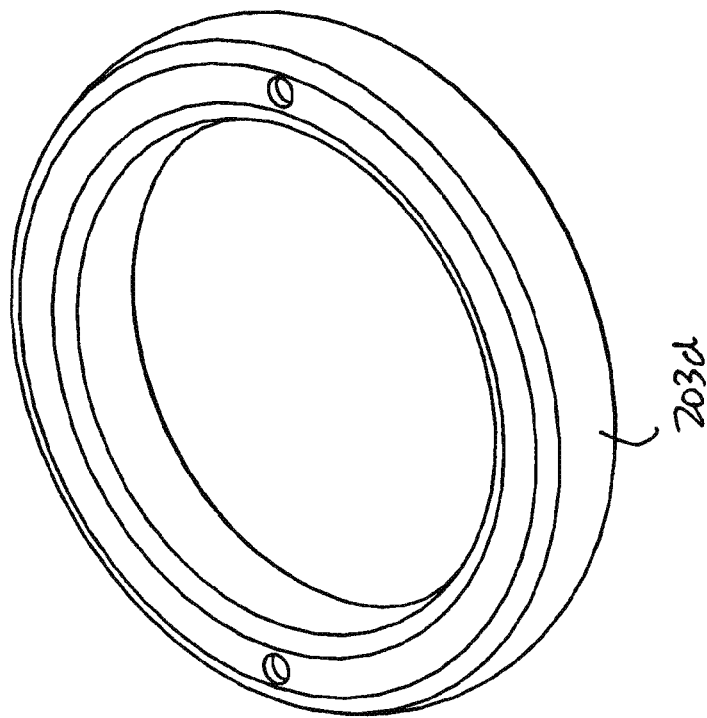
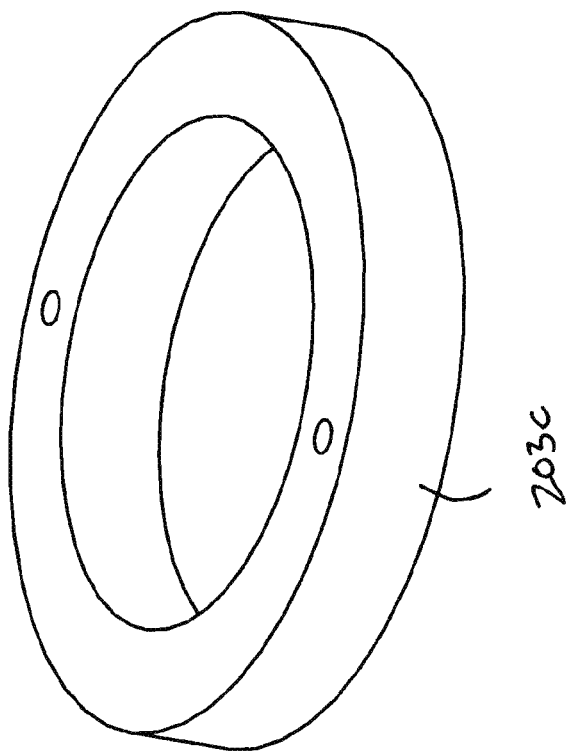
FIG. 9

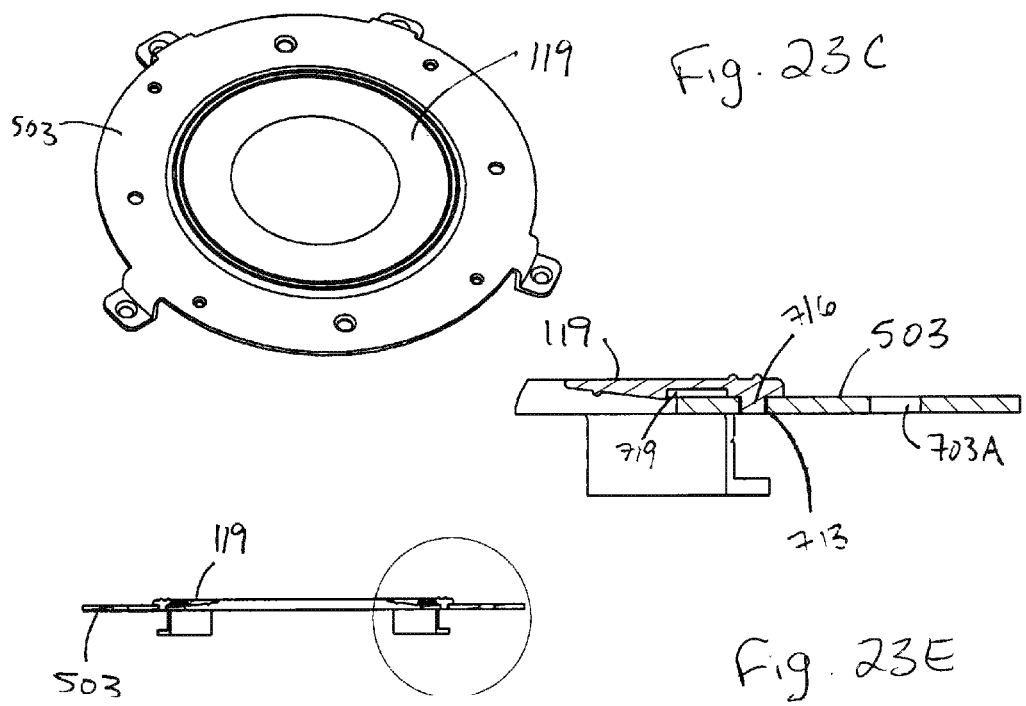

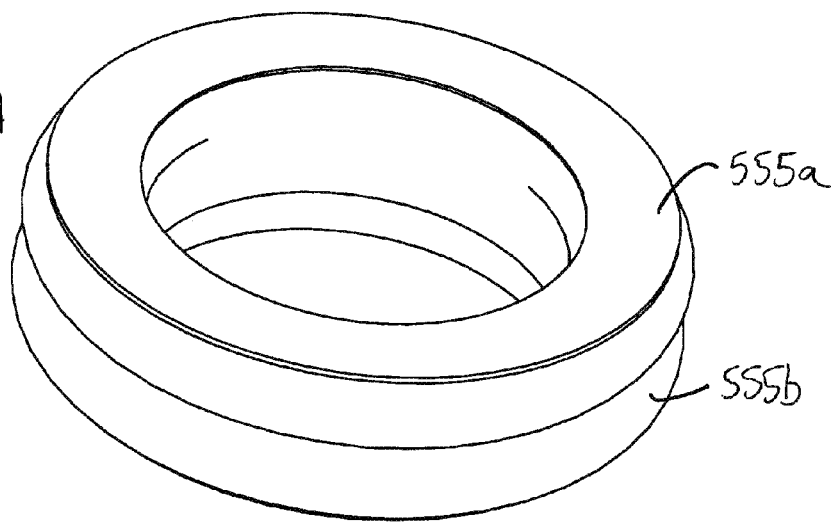
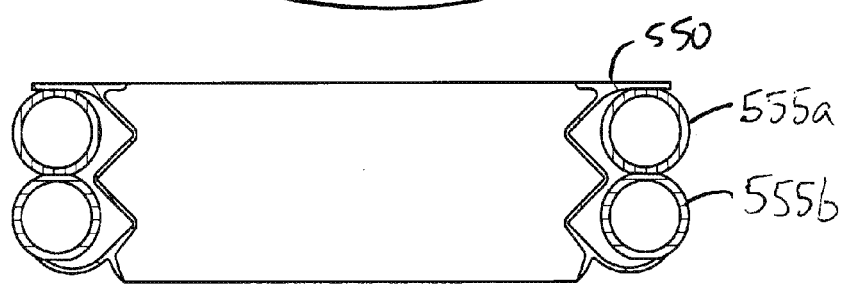

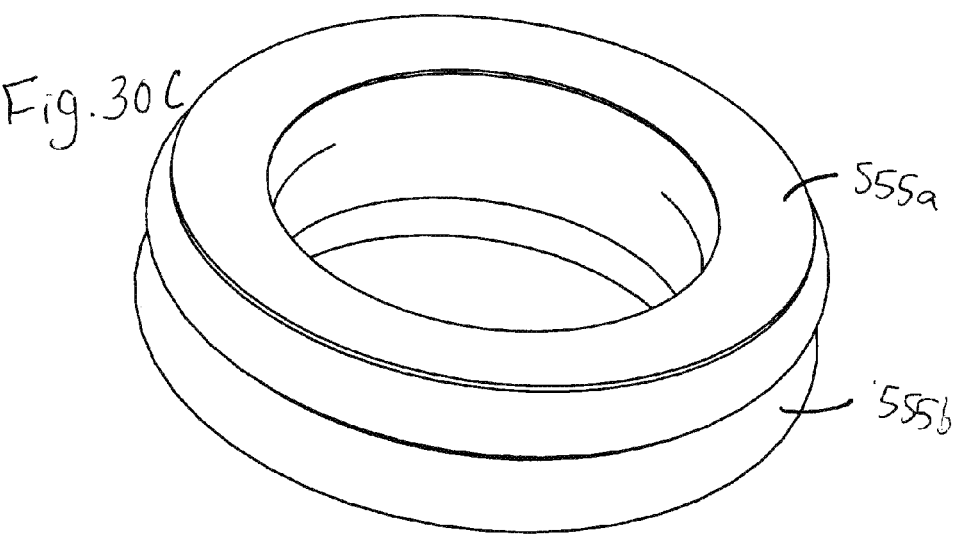
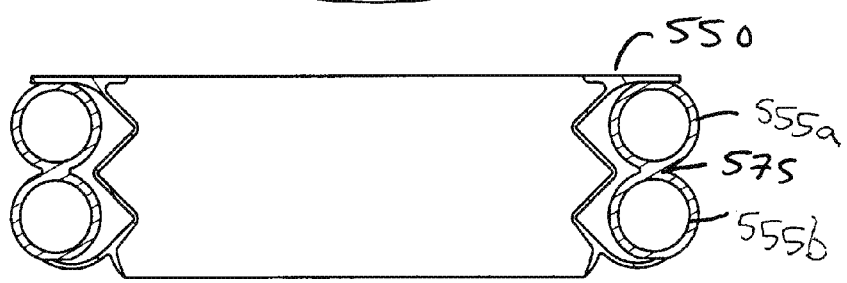

CLOSET COLLAR ADAPTATIONS

CROSS-REFERENCE TO RELATED CASES

The present patent application is a Continuation application of, and claims priority to, copending U.S. Non-Provisional patent application entitled "CLOSET COLLAR ADAPTATIONS" and having Ser. No. 13/771,773, filed on Feb. 20, 2013, which is incorporated herein by reference in its entirety and which claims priority to both U.S. provisional application U.S. Provisional Patent Application 61/600,794 filed on Feb. 20, 2012, and U.S. Provisional Patent Application 61/667,377 filed on Jul. 2, 2012. Each of these applications is incorporated by reference herein in its entirety.

BACKGROUND

A closet collar may provide a connection between a toilet and a drain pipe. Closet collars can be installed improperly making it difficult to install a toilet without a leaky seal.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIGS. 9 and 10A-10B are drawings showing examples of flexible seal rings that may be used with a closet collar adaptation assembly according to various embodiments of the present disclosure.

FIGS. 23A-23E are drawings of another embodiment of a sealing washer for a closet collar adaptation assembly according to various embodiments of the present disclosure.

FIGS. 28A-28B, 29A-29B, and 30A-30D are drawings showing examples of flexible rings for a closet collar adaptation assembly according to various embodiments of the present disclosure.

DETAILED DESCRIPTION

Figure 1A:
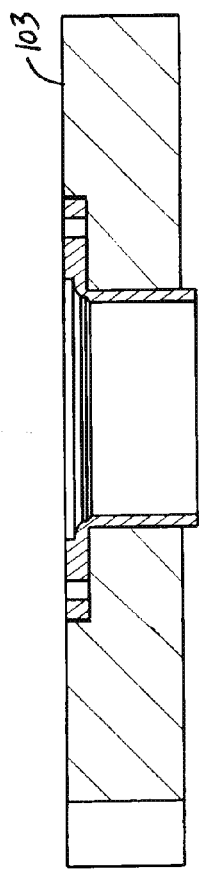
FIGS. 1A-1C are drawings showing examples of a closet collar according to various embodiments of the present disclosure.
Figure 1B:
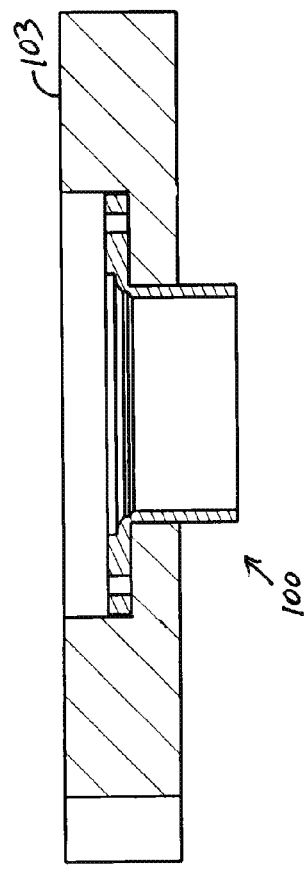
Figure 1C:
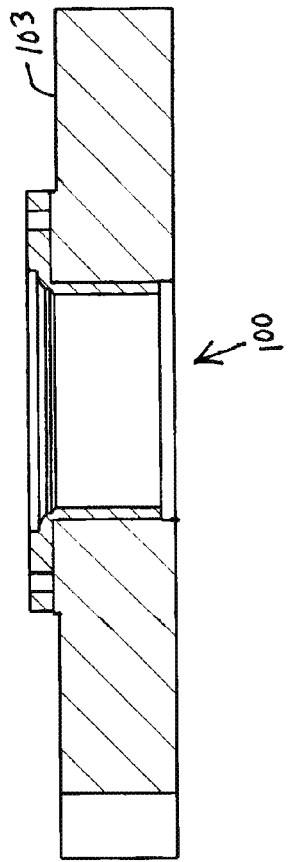

With reference to FIGS. 1A, 1B, and 1C, shown are examples of closet collars 100 upon which toilets may be installed. The closet collars 100 provide the drain point for a toilet where sewage leaves the toilet and is provided to a sewage system as can be appreciated. The closet collars 100 are shown relative to flooring 103. In the embodiment of FIG. 1A, the closet collar 100 is recessed with respect to the flooring 103 so that the upper surface of the closet collar 100 is flush with the surface of the flooring 103. Such may occur, for example, where the closet collar 100 is installed on subflooring and then finished flooring 103 is installed around the closet collar 100. For example, ceramic tile or other types of a flooring 103 may be installed on subflooring and result in the upper surface of the closet collar 100 being flush with the surface of the flooring 103. Referring to FIG. 1B, shown is a situation in which the closet collar 100 is recessed with respect to the flooring 103 such that the top surface of the closet collar 100 is below the top surface of the flooring 103. Such may occur, for example, where the closet collar 100 is installed onto subflooring and then finished flooring having a relatively large thickness is installed around it. With reference to FIG. 1C, shown is a situation in which the closet collar 100 is installed on top of the flooring 103. In the embodiment of FIG. 1C, the top surface of the closet collar 100 is above the top surface of the flooring 103. As contemplated herein, the closet collar 100 in any given installation might fall within any one of the configurations described with reference to FIG. 1A, 1B, or 1C.

Figure 2A:
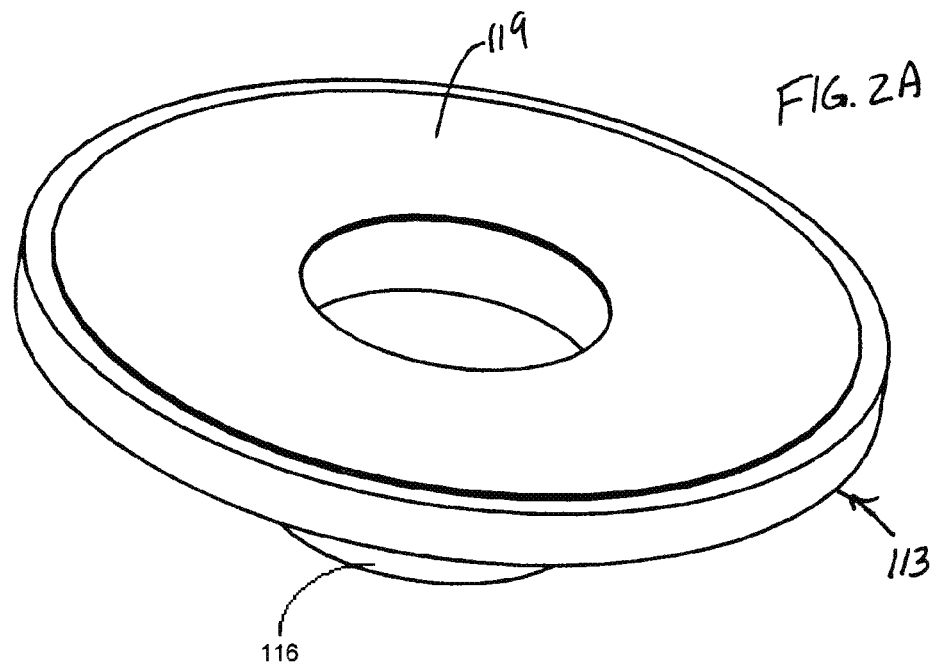
FIGS. 2A-2C are drawings showing examples of a closet collar adapter according to various embodiments of the present disclosure.
Figure 2B:
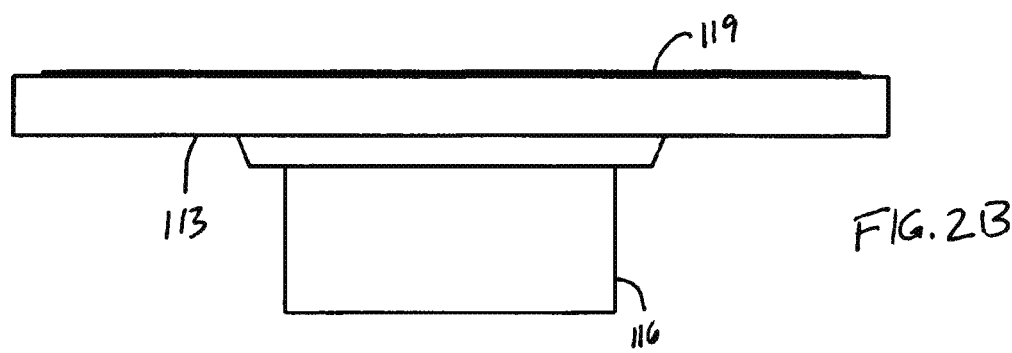
Figure 2C:
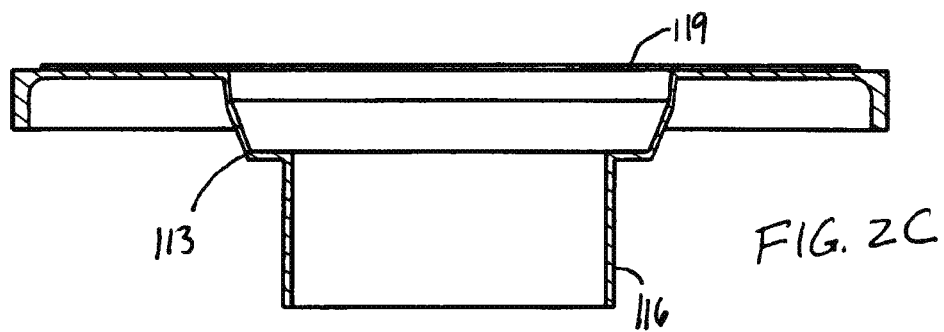

With reference to FIGS. 2A, 2B, and 2C, shown is an example of a closet collar adapter 113 according to various embodiments. A closet collar adapter 113 includes a pipe extension 116 that is configured to extend down into a closet collar 100 (FIGS. 1A-1C). Also, a sealing washer 119 may be disposed on top of the closet collar adapter 113. According to various embodiments, the sealing washer 119 may be affixed to an upper surface of the closet collar adapter 113 by way of an appropriate adhesive, for example, thereby forming a sealed junction between the sealing washer 119 and the upper surface of the closet collar adapter 113. In alternative embodiments, the sealing washer 119 may be affixed to the upper surface of the closet collar adapter 113 by being overmolded or by using any other suitable process. In further alternative embodiments, the sealing washer 119 and the closet collar adapter 113 may be integrally molded as a single part. The sealing washer 119 may be made from rubber or other appropriate material that facilitates an appropriate seal with a horn extending from the underside of a toilet as will be described.

Figure 3:
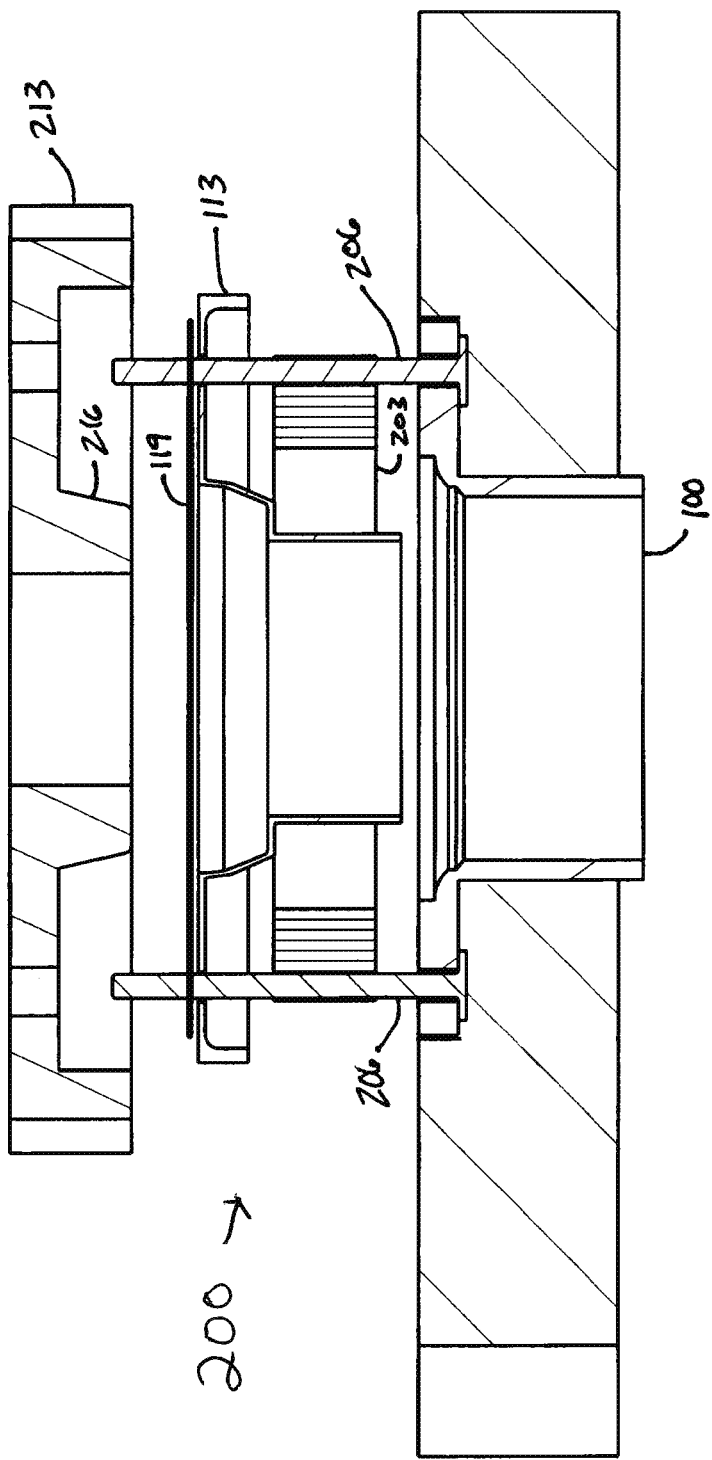
FIGS. 3-5 are drawings showing an example of a closet collar adaptation assembly according to various embodiments of the present disclosure.

With reference to FIG. 3, shown is an example of a closet collar adaptation assembly 200 according to various embodiments of the present disclosure. According to various embodiments, the closet collar adaptation assembly 200 may include the closet collar adapter 113, a flexible seal ring 203, one or more anchor bolts 206, the sealing washer 119, and possibly other components. The closet collar adapter 113 may mount to and form a seal with the closet collar 100. Although the embodiment of FIG. 3 shows the components of the closet collar adaptation assembly 200 as being separate components, in alternative embodiments, one or more of the components of the adaptation assembly 200 may be integrally molded as a single component. In further alternative embodiments, one or more of the components of the closet collar adaptation assembly 200 may be bonded to form a single component using, for example, an overmolding process or any other suitable method.

Positioned above the closet collar adaptation assembly 200 is the bottom of a toilet 213 that includes the horn 216. The horn 216 of the toilet 213 mates with the closet collar adaptation assembly 200 to form a seal between the horn 216 and the closet collar 100. The seal between the horn 216 and the closet collar adaptation assembly 200 facilitates the passage of sewage matter from the toilet 213 through the closet collar 100 and down the drain pipe as can be appreciated.

The flexible seal ring 203 may be made of a material that facilitates the flexible seal ring 203 flexing and at least partially collapsing with pressure, thereby forming a seal between the underside of the closet collar adapter 113 and the sealing surface of the closet collar 100. In alternative embodiments, a wax ring may be used instead of or in addition to the flexible seal ring 203. Such a flexible seal ring 203 may be made of, for example, neoprene, foam rubber, polyvinylchloride (PVC) rubber, thermoplastic elastomer (TPE), thermoplastic rubber (TPR), styrene-butadiene rubber (SBR), ethylene propylene diene monomer (EPDM) rubber, or any other material that facilitates the flexible seal ring 203 at least partially collapsing and sealing against the respective surfaces. These materials may facilitate the flexible seal ring 203 being reusable, unlike a wax ring which typically is made for a single use. In this sense, when the toilet 213 and/or the closet collar adaptation assembly 200 is removed, the flexible seal ring 203 may return at least partially to the shape in which it was prior to the toilet 213 and/or the closet collar adaptation assembly 200 causing the flexible seal ring 203 to at least partially collapse. Additionally, the flexible seal ring 203 may comprise an antimicrobial material. For example, the flexible seal ring 203 may comprise an antimicrobial coating.

Additionally, the material selected for the flexible seal ring 203 may be chosen so that it may withstand the corrosive effects of the sewage gases and matter that flows from the toilet 213 into the drain through the closet collar 100 as can be appreciated. The closet collar adaptation assembly 200 is shown in FIG. 3 using an exploded view in which components have not yet been completely assembled.

Figure 4:
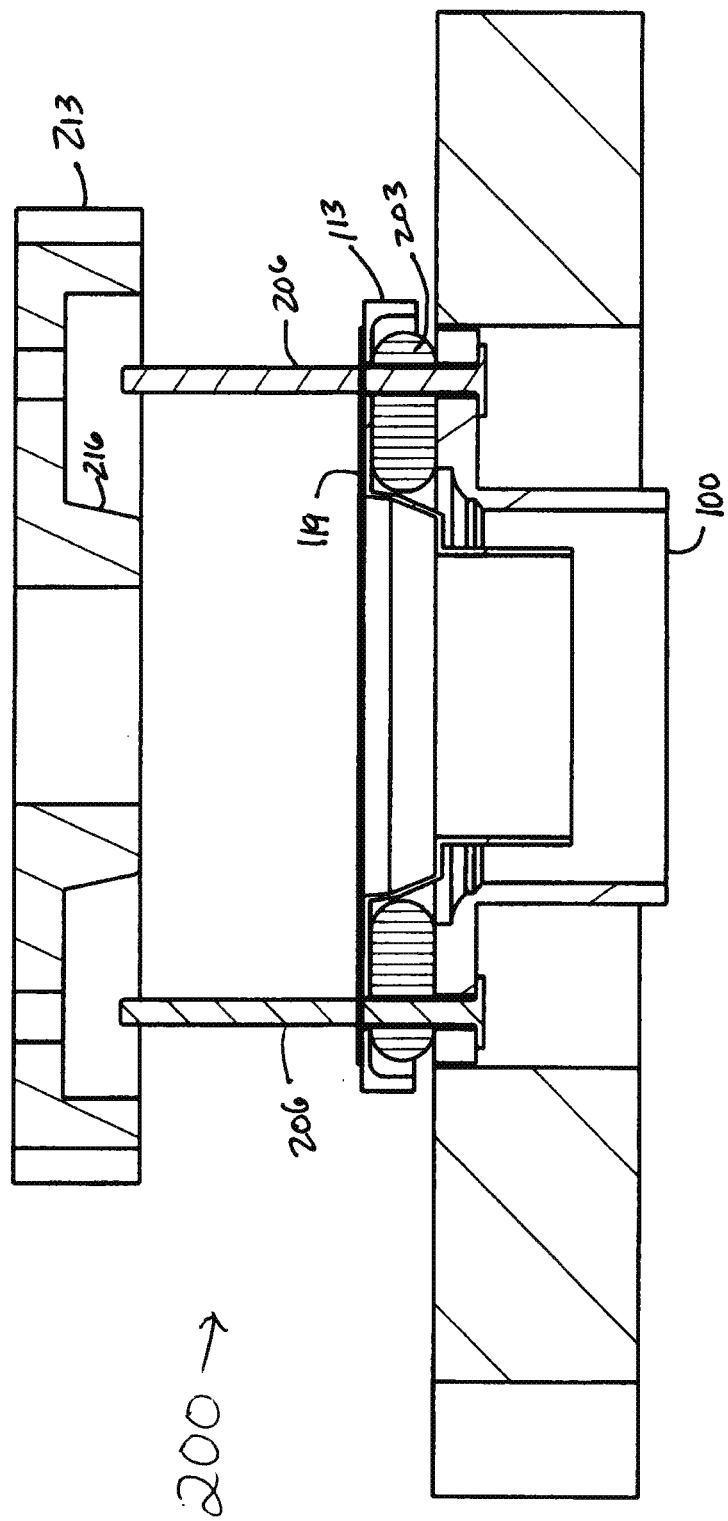

Referring to FIG. 4, shown is the closet collar adaptation assembly 200 in which the closet collar adapter 113 has been pushed down onto the flexible seal ring 203, thereby compressing the flexible seal ring 203 as shown. The sealing washer 119 is disposed at the top of the closet collar adapter 113 and includes a hole through which the horn 216 of the toilet 213 protrudes. The sealing washer 119 may thereby form a seal with the sides of the horn 216 to prevent sewage gases or other matter from escaping during the toilet flush cycle or at other times. The anchor bolts 206 may be restricted to the closet collar 100 in holes or slots that are typically found within closet collars 100 as can be appreciated.

Figure 5:
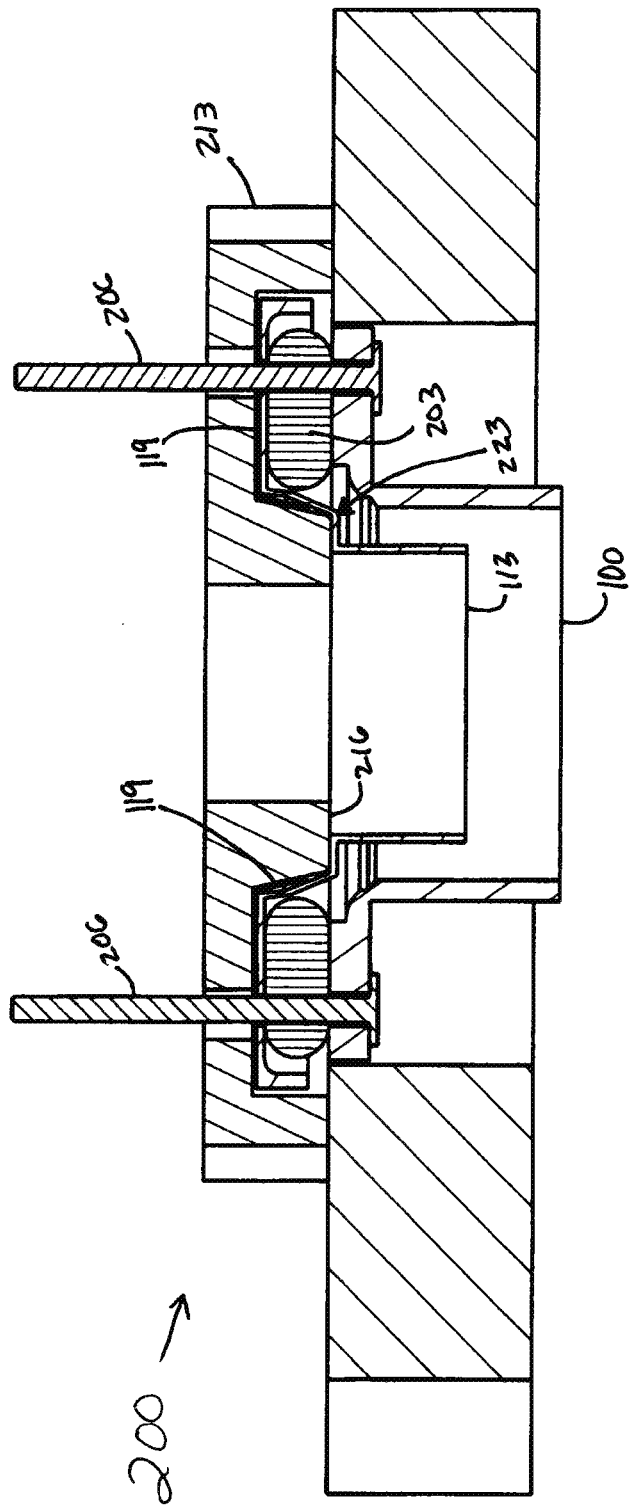

With reference to FIG. 5, shown is an example of the closet collar adaptation assembly 200 in which the toilet 213 has been placed over the closet collar adaptation assembly 200 and the horn 216 has been pressed through the center opening of the sealing washer 119. As shown, the sealing washer 119 may be stretched down around the sides of the horn 216, thereby forming a seal between the side of the horn 216 and the sealing washer 119. In addition, wax may be provided at strategic locations inside the closet collar adapter 113 so that the sides of the horn 216 may come into contact with the wax to form a seal in addition to, or as an alternative to, the use of the sealing washer 119. For example, such wax may be placed in the corner 223 or in other locations formed in the closet collar adapter 113. As a result, the wax may contact a portion of the horn 216 to further form a seal between the horn 216 and closet collar adapter 113. In alternative embodiments, the side walls of the closet collar adapter 113 may be shaped to provide for holding areas or reservoirs in which wax or other sealants may be retained. When the horn 216 is inserted into closet collar adapter 113, the wax or other sealants in the holding areas or reservoirs may come into contact with the horn 216. The holding areas or reservoirs may provide for greater precision in terms of sealing to prevent sewage leaks and may also facilitate assembly and/or installation of the closet collar adaptation assembly 200.

Figure 6:
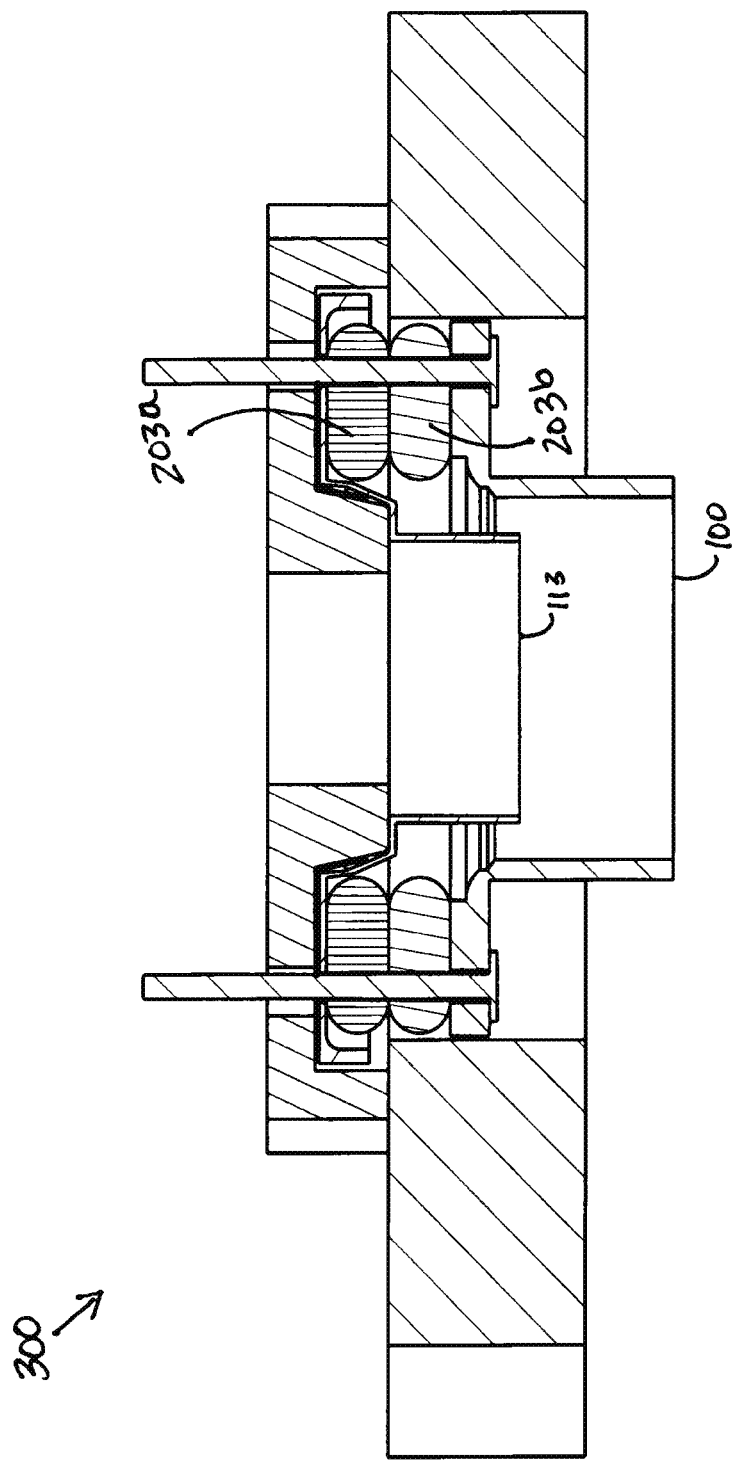
FIG. 6 is a drawing showing another example of a closet collar adaptation assembly according to various embodiments of the present disclosure.

With reference to FIG. 6, shown is a closet collar adaptation assembly 300 according to another embodiment of the present disclosure. The closet collar adaptation assembly 300 is similar to the closet collar adaptation assembly 200 described above, with the exception that the closet collar adaptation assembly 300 shown in FIG. 6 includes multiple flexible seal rings 203a and 203b that are sandwiched together as shown. In the embodiment shown in FIG. 6, the closet collar adaptation assembly 300 includes two flexible seal rings 203a and 203b. However, fewer or greater quantities of flexible seal rings 203a and 203b may be used in alternative embodiments. Having multiple flexible seal rings 203a and 203b may provide a proper seal between the closet collar adapter 113 and the closet collar 100 when the closet collar 100 is recessed relatively far down in the flooring 103 (FIG. 1) as can be appreciated.

Figure 7:
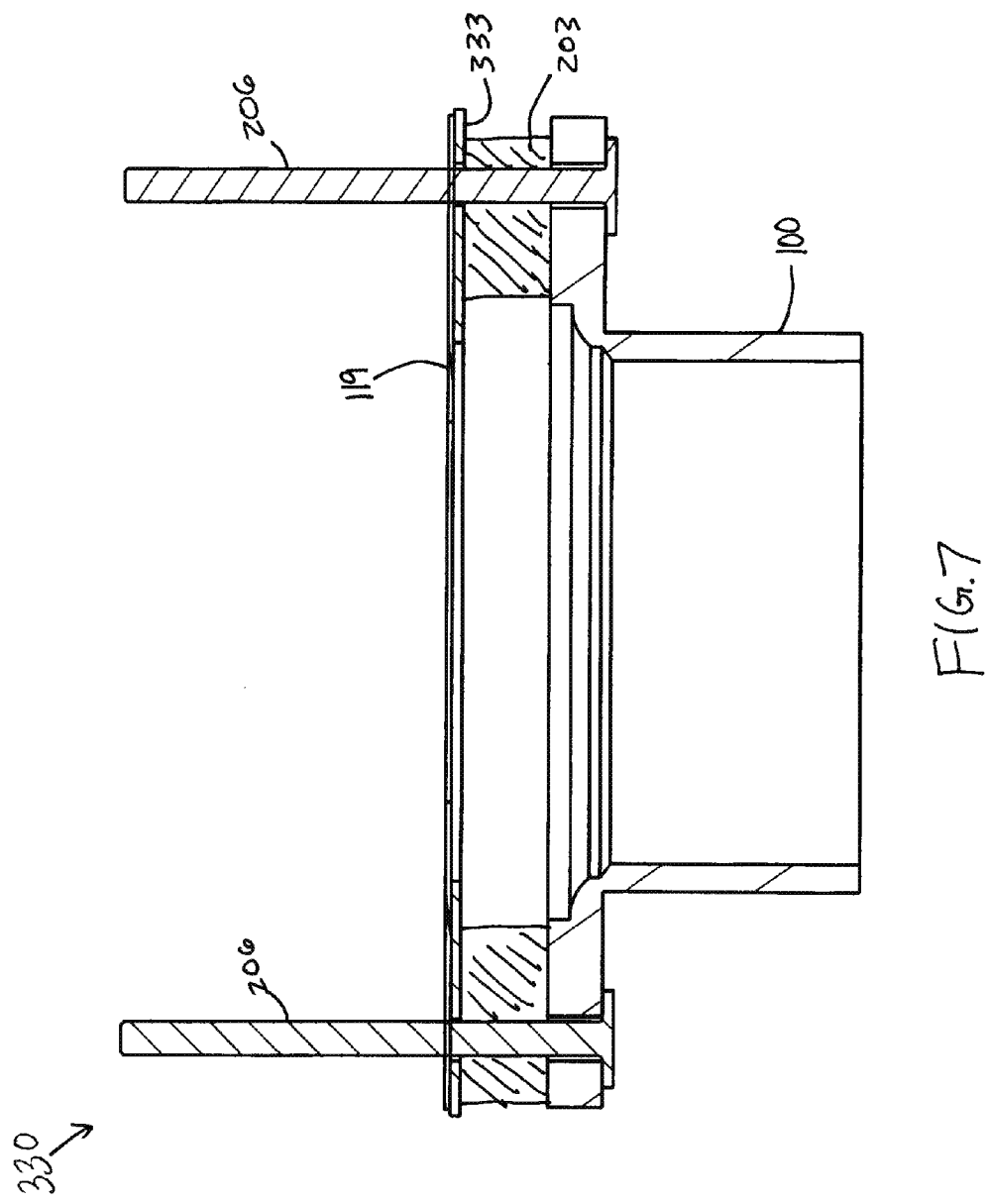
FIG. 7 is a drawing showing another example of a closet collar adaptation assembly according to various embodiments of the present disclosure.

With reference to FIG. 7, shown is another example of a closet collar adaptation assembly 330 according to various embodiments. The closet collar adaptation assembly 330 in the embodiment of FIG. 7 includes an adapter plate 333 that includes a hole through which the horn 216 (FIG. 3) of a toilet may protrude. The sealing washer 119 may be affixed to the top of the adapter plate 333 and may form a sealed joint therebetween. The flexible seal ring 203 is disposed between the adapter plate 333 and the closet collar 100 as shown. The horn 216 of a toilet may be positioned to extend through the sealing washer 119 and the inner hole of the adapter plate 333, thereby forming a seal between the sides of the horn 216 of the toilet, as described above, via the sealing washer 119. Thus, the closet collar adaptation assembly 330 provides for the installation of a toilet 213 without the use of the closet collar adapter 113 described above.

Although the embodiment of FIG. 7 shows the components of the closet collar adaptation assembly 330 as being separate components, in alternative embodiments, one or more of the components of the adaptation assembly 330 may be integrally molded as a single component. In further alternative embodiments, one or more of the components of the closet collar adaptation assembly 330 may be bonded to form a single component using, for example, an overmolding process or any other suitable method. For example, the sealing washer 119 may be overmolded to the adapter plate 333 in various embodiments.

Figure 8:
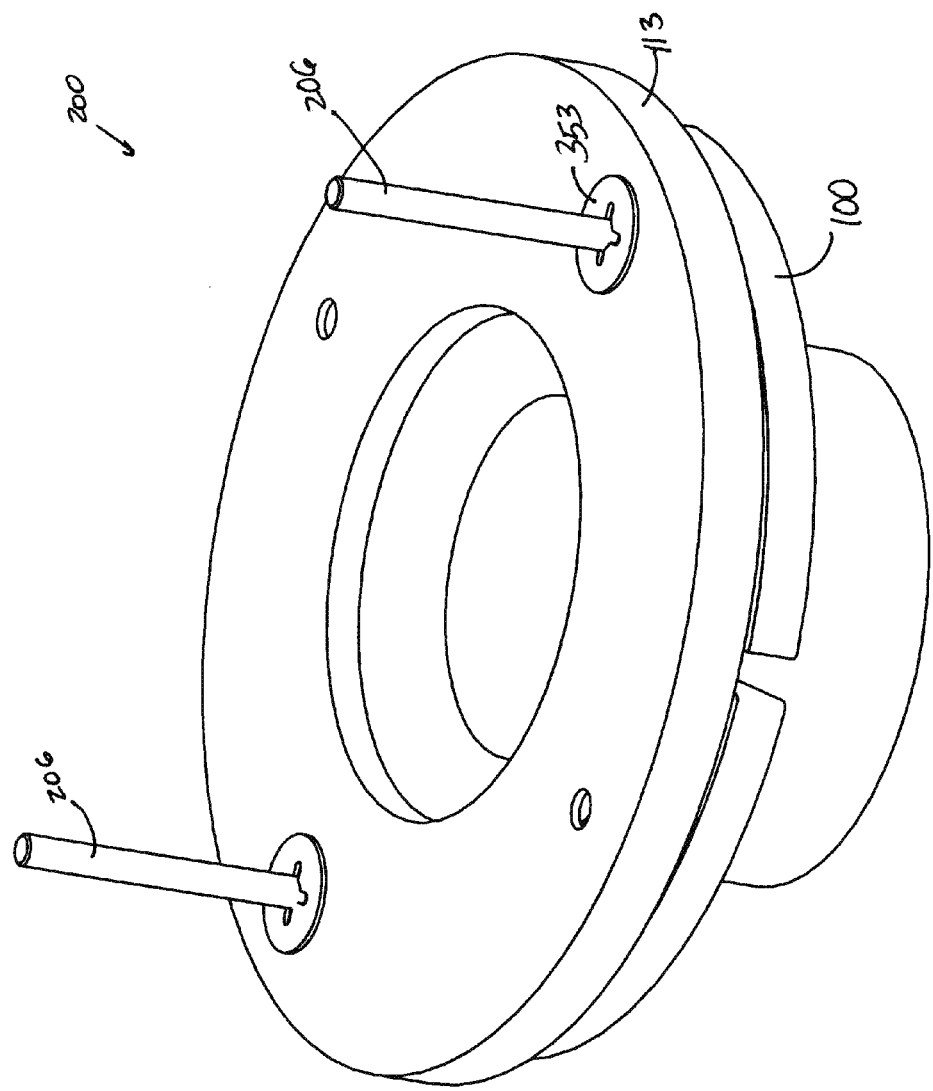
FIG. 8 is a drawing showing an example of clips that may be used with a closet collar adaptation assembly according to various embodiments of the present disclosure.

Referring next to FIG. 8, shown is a view of an example of clips 353 that may be used with various closet collar adaptation assemblies 200 according to various embodiments. In FIG. 8, the clips 353 are shown being used with the closet collar adaptation assembly 200. In alternative embodiments, the clips 353 may be used with the closet collar adaptation assembly 300 (FIG. 6), the closet collar adaptation assembly 330 (FIG. 7), or with other embodiments. The clips 353 may be slid onto the anchor bolts 206 so that they make contact with the sealing washer 119 (FIG. 2) that is disposed on top of the closet collar adapter 113. The clips 353 may be pushed down such that the flexible seal ring (not shown) is compressed by the clips 353 to hold the closet collar adaptation assembly 200 and to hold the anchor bolts 206 in place, thereby facilitating the toilet 213 (FIG. 3) being positioned over the closet collar adaptation assembly 200.

Referring to FIG. 9, shown are two examples of the flexible seal ring 203, denoted here as flexible seal ring 203c and flexible seal ring 203d. The flexible seal ring 203c may comprise foam rubber, PVC rubber, neoprene, or other types of sealing materials. Such materials may be antimicrobial according to various embodiments. Additionally, the flexible seal ring 203 according to various embodiments may comprise a coating, such as an antimicrobial coating. The flexible seal ring 203d may be manufactured from extruded rubber or other types of suitable materials as can be appreciated.

Figure 10A:
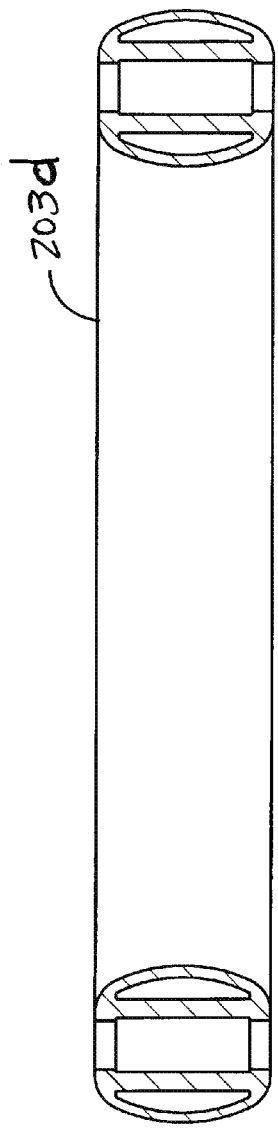
Figure 10B:
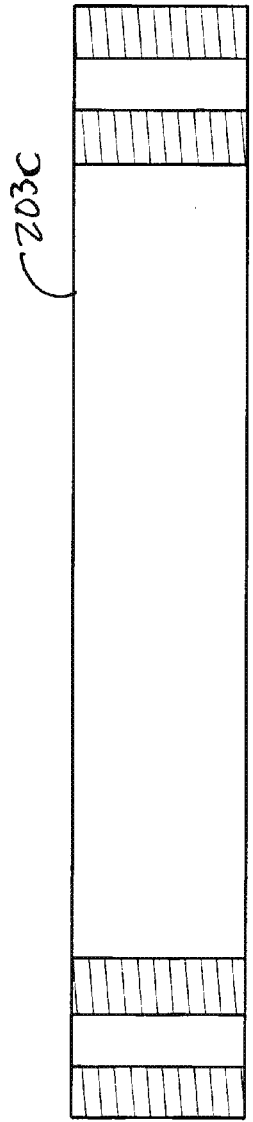
Figure 11:
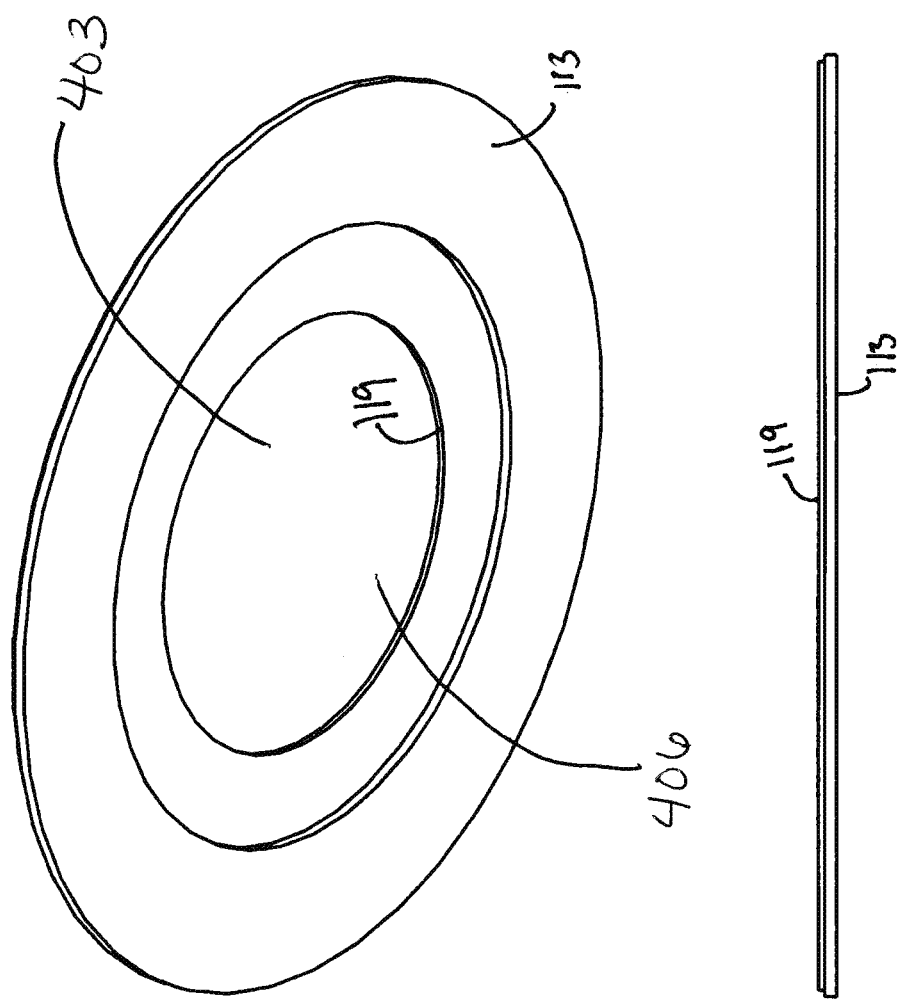
FIGS. 11-14 are drawings showing an example of a sealing washer that may be used with a closet collar adaptation assembly according to various embodiments of the present disclosure.
Figure 12:
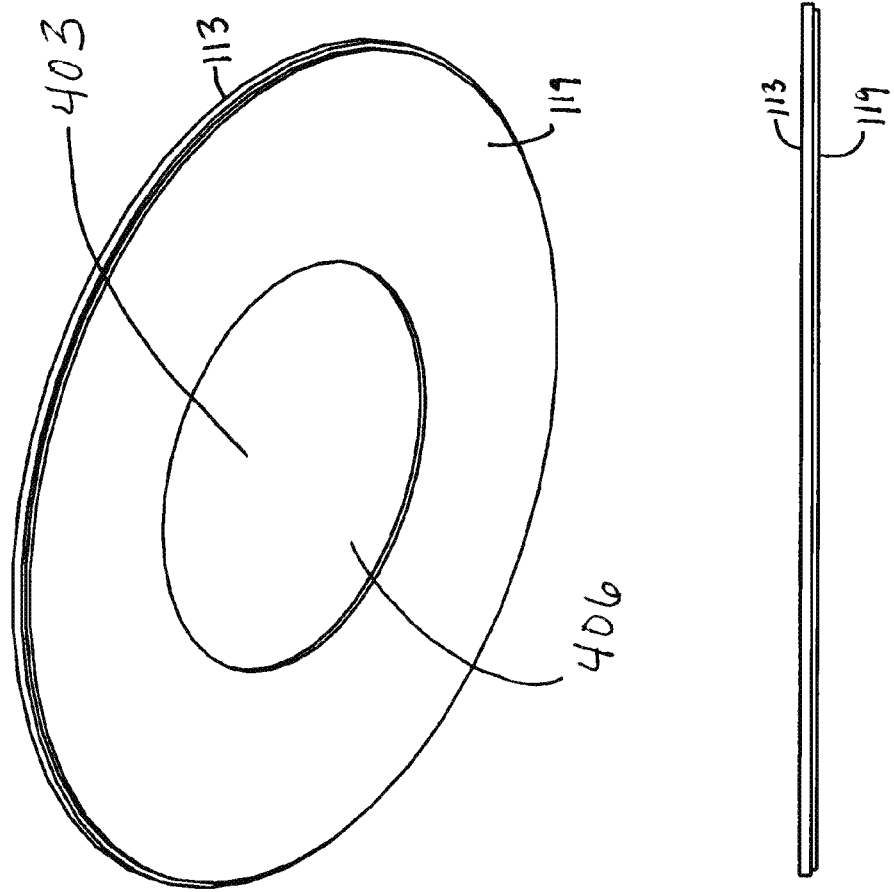
Figure 13:
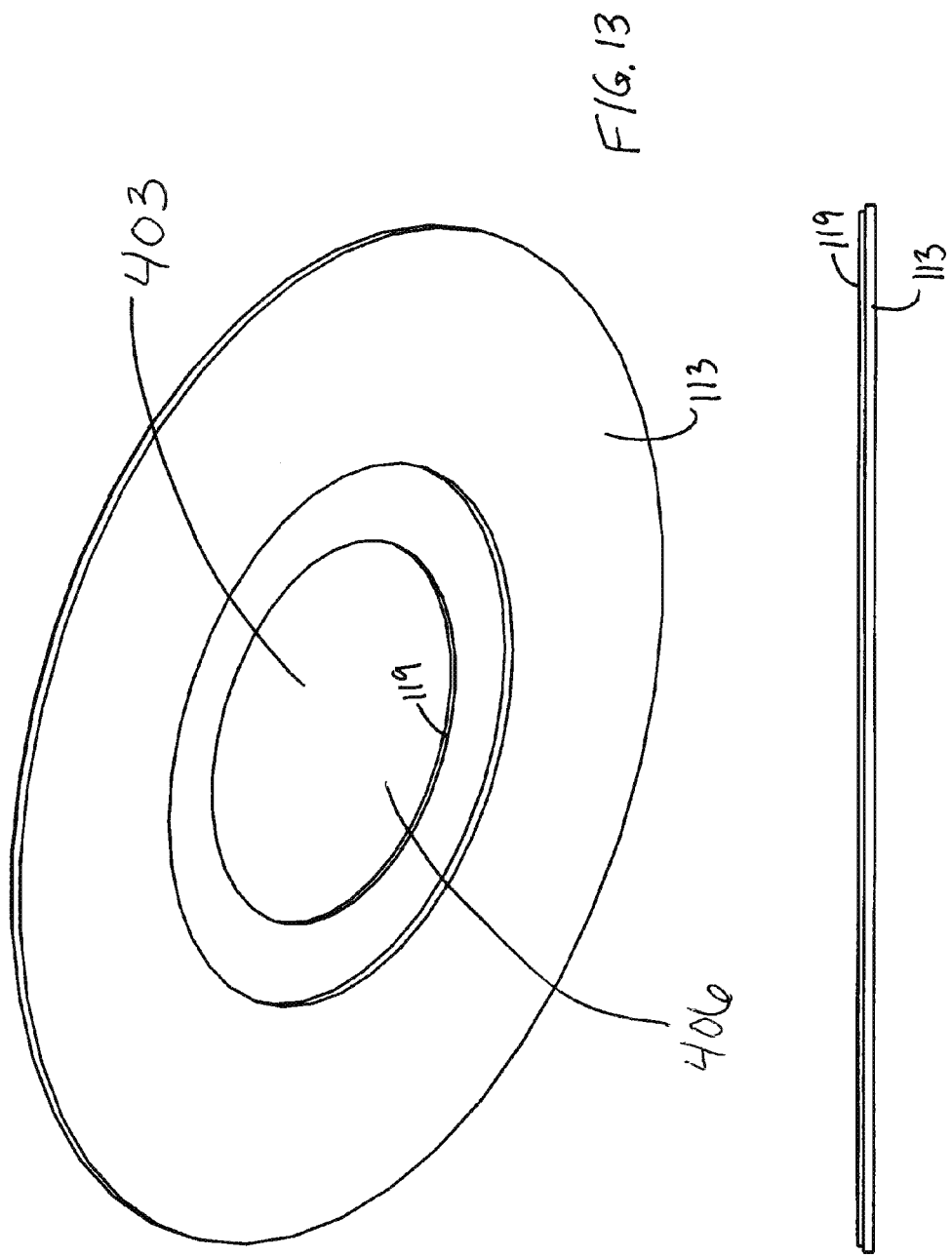
Figure 14:
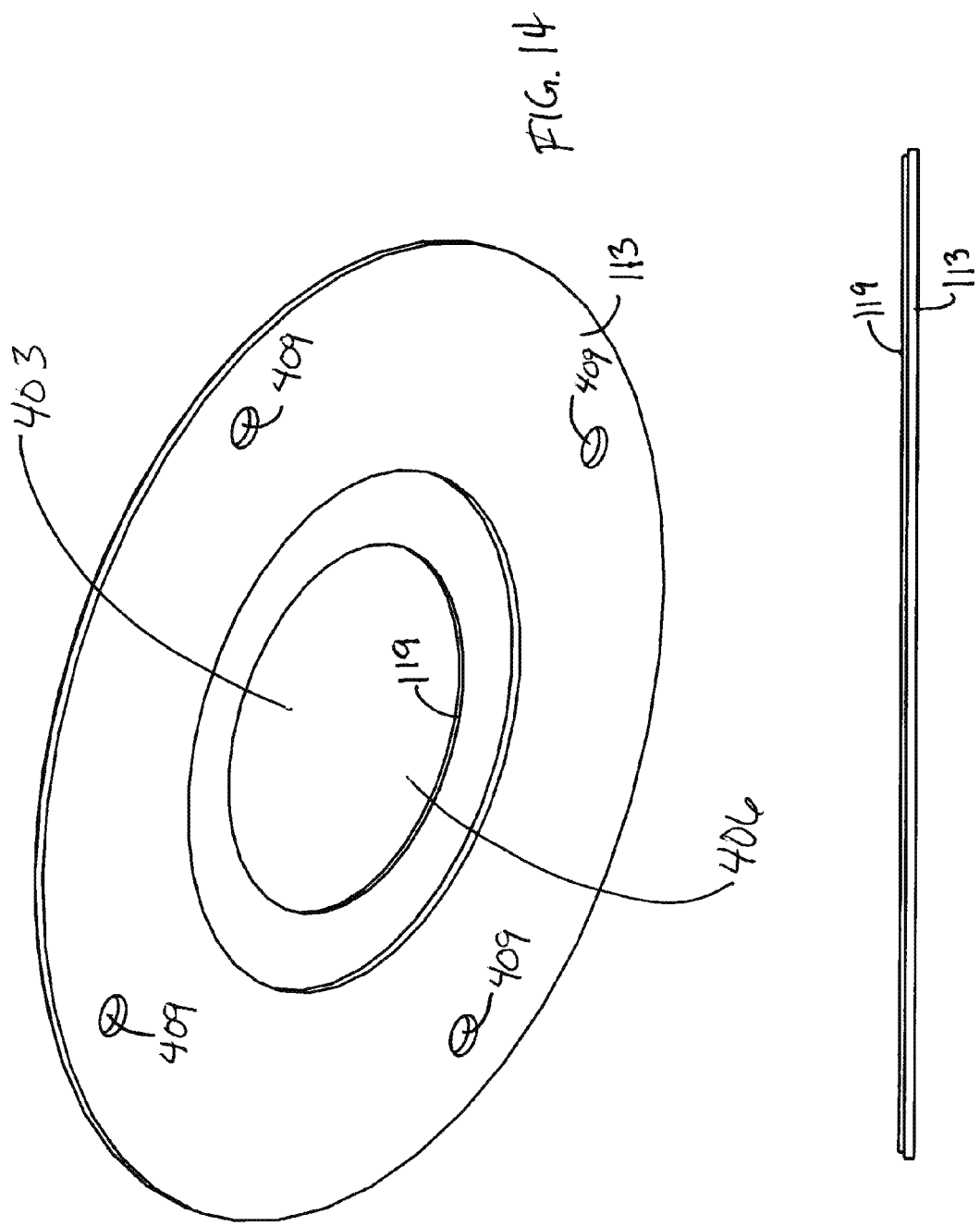

Referring next to FIGS. 10A and 10B, shown are cross-sectional views of the flexible seal rings 203c and 203d. As shown, the flexible seal ring 203d has several walls that may facilitate the flexible seal ring 203d at least partially collapsing when compressed. The flexible seal ring 203c comprises a material that may facilitate the flexible seal ring 203c at least partially collapsing to form the appropriate seals as can be appreciated.

With reference to FIGS. 11, 12, 13, and 14, shown is the sealing washer 119 positioned on the upper flat surface of the closet collar adapter 113 according to various embodiments. In the embodiments of FIGS. 11, 12, 13, and 14, the sealing washer 119 comprises a center hole 403 with a radius that is less than the radius of the opening 406 for the closet collar adapter 113. According to various embodiments, the closet collar adapter 113 may comprise one or more holes 409 through which bolts, screws, or any other suitable type of fasteners may insert to hold at least portions of the system down as can be appreciated.

Figure 15:
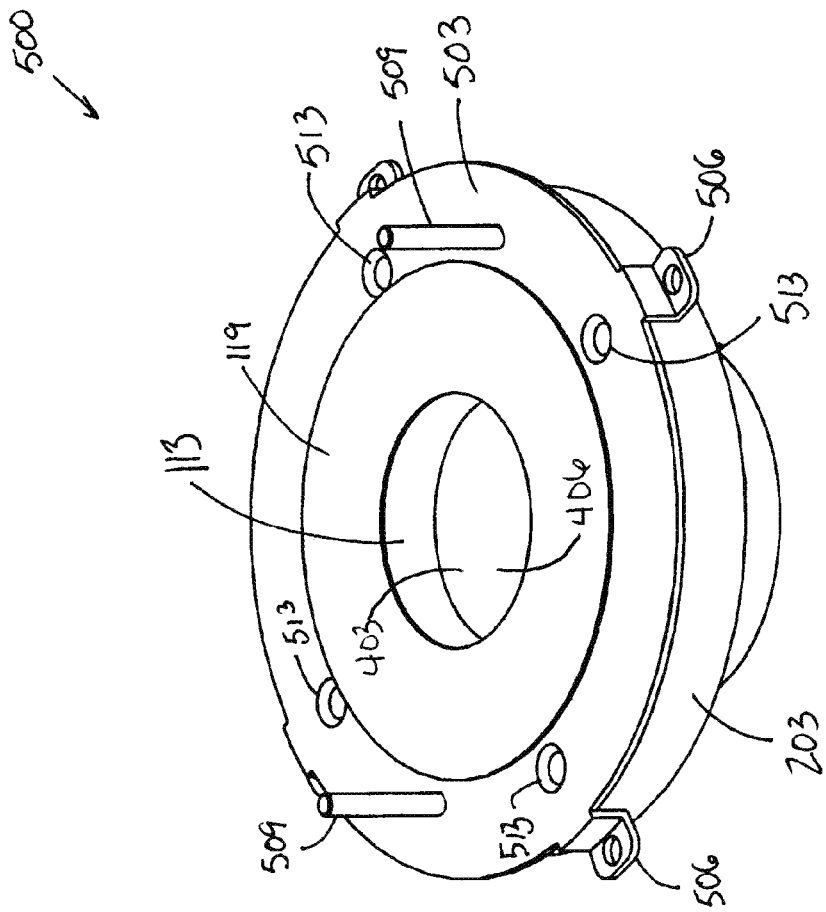
FIG. 15 is a drawing showing another example of a closet collar adaptation assembly according to various embodiments of the present disclosure.

Referring next to FIG. 15, shown is another example of a closet collar adaptation assembly 500 according to various embodiments. The closet collar adaptation assembly 500 in the embodiment of FIG. 15 includes the sealing washer 119 and the closet collar adapter 113. In addition, disposed over the closet collar adapter 113 is an adapter plate 503. The adapter plate 503 may be constructed of steel, aluminum, or other metal as can be appreciated. In alternative embodiments, the adapter plate 503 may be constructed of plastic, for example, or any other type of suitable material. The adapter plate 503 according to various embodiments may also comprise an integrated antimicrobial agent. Additionally or alternatively, various embodiments of the adapter plate 503 may include an antimicrobial coating, such as an antimicrobial paint, an antimicrobial metal powder coating, or any other type of finish.

Although the embodiment of FIG. 15 shows the components of the closet collar adaptation assembly 500 as being separate components, in alternative embodiments, one or more of the components of the adaptation assembly 500 may be integrally molded as a single component. In further alternative embodiments, one or more of the components of the closet collar adaptation assembly 500 may be bonded to form a single component using, for example, an overmolding process or any other suitable method. For example, the sealing washer 119, the closet collar adapter 113, and/or other components may be overmolded to the adapter plate 503 in various embodiments.

The adapter plate 503 may include one or more legs 506 that can be used to fasten the adapter plate 503 to the flooring 103 (FIG. 1A), thereby holding the closet collar adaptation assembly 500 in proper position with respect to the closet collar 100 (FIG. 1A). It may be that the feet of the legs 506 come into contact with the flooring 103, or they might be suspended above the flooring 103 such that a screw or bolt rigidly adheres the legs 506 to the flooring 103.

Protruding from the adapter plate 503 are bolts 509 that may be, for example, affixed directly to the adapter plate 503 according to various embodiments. The bolts 509 may insert into corresponding holes in the toilet 213 (FIG. 3) and be used to fasten the toilet 213 to the closet collar adaptation assembly 500. The flexible seal ring 203 may be disposed under the closet collar adapter 113 as described above. The adapter plate 503 may provide greater stability in that it may be attached to the flooring 103 around the closet collar 100 for cases, for example, where the closet collar 100 may be broken or otherwise compromised. In addition, screws may be used to affix the adapter plate 503 to the floor structure through the holes 513 as shown. Such screws may protrude through the flexible seal ring 203 according to various embodiments.

Figure 16:
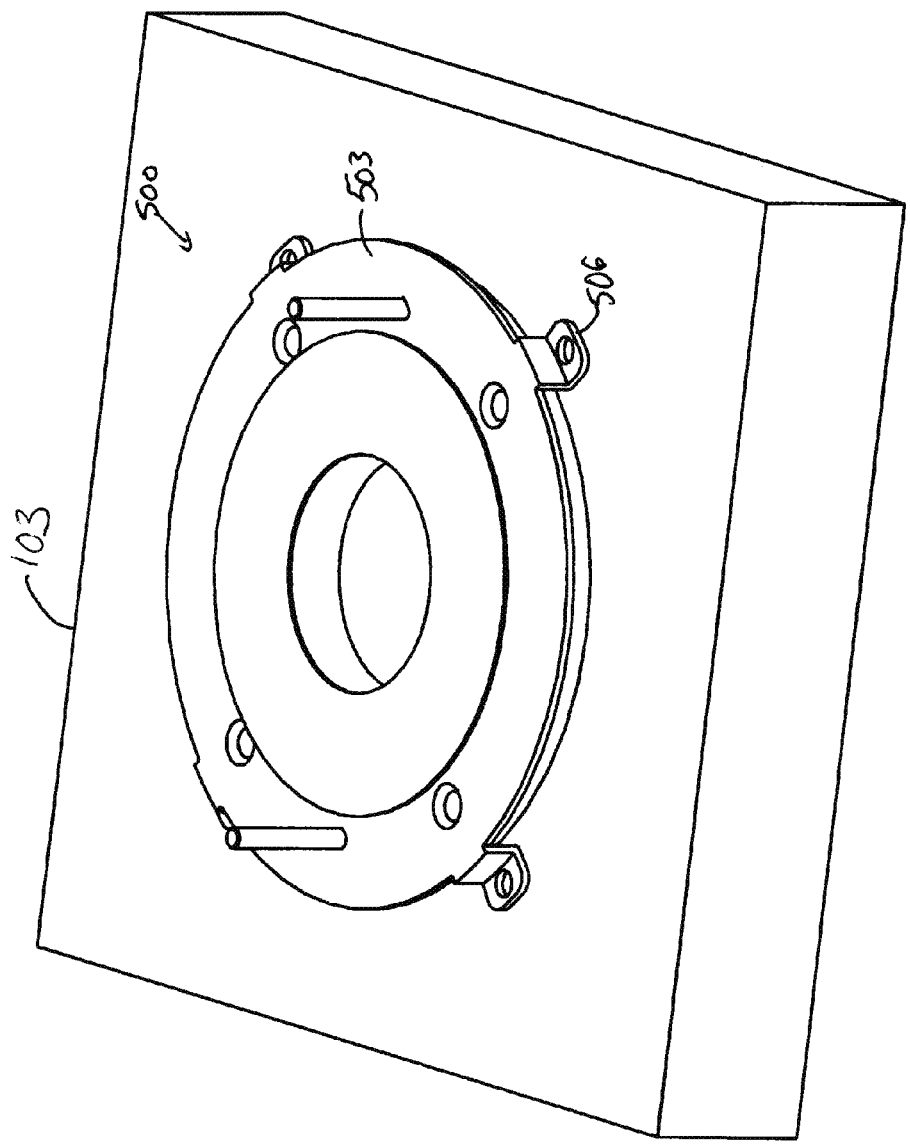
FIG. 16 is a drawing showing another example of a closet collar adaptation assembly according to various embodiments of the present disclosure.

With reference to FIG. 16, shown is an example of the closet collar adaptation assembly 500 after it has been installed over a closet collar 100 (not visible) such that the legs 506 come into contact with flooring 103. By bolting the adapter plate 503 to the flooring 103, greater stability of the connection between the toilet and the closet collar 100 may be provided.

Figure 17:
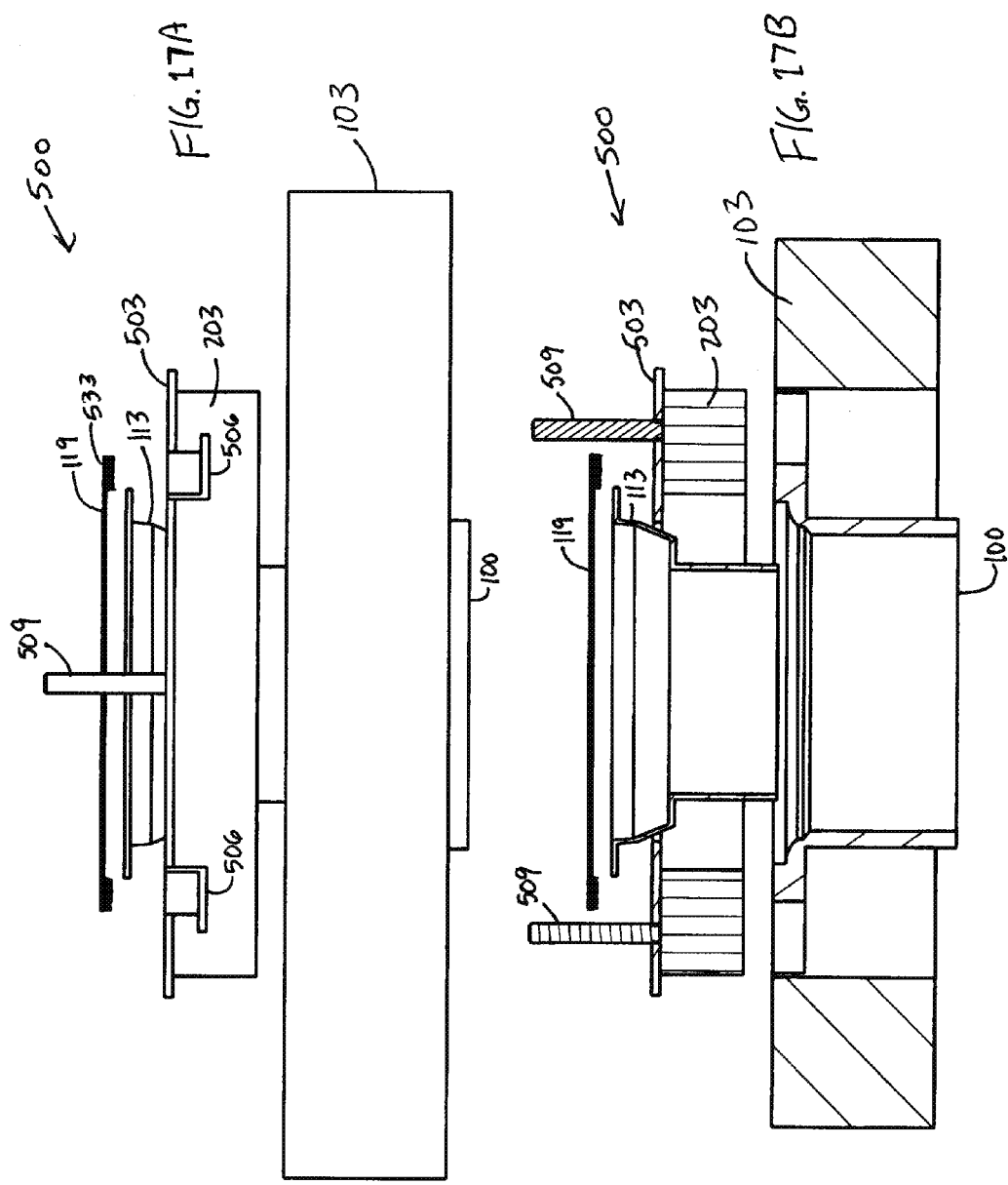
FIGS. 17A-17B are drawings of another example of a closet collar adaptation assembly according to various embodiments of the present disclosure.

With reference to FIGS. 17A and 17B, shown are additional drawings of the closet collar adaptation assembly 500 according to various embodiments of the present disclosure. In particular, FIG. 17A shows a partially-exploded side view, and FIG. 17B shows a partially-exploded cross-section view of the closet collar adaptation assembly 500 according to various embodiments. According to various embodiments, the sealing washer 119 may include thickened portions 533 along the outside diameter of the sealing washer 119 that are configured to contact the adapter plate 503. According to various embodiments, the thickened portions 533 may be adhered to the adapter plate 503. Also, the sealing washer 119 is configured to contact the closet collar adapter 113. According to various embodiments, the sealing washer 119 may be sealed or affixed to the closet collar adapter 113 to form a seal between the closet collar adapter 113 and the sealing washer 119. Thus, the sealing washer 119 may be affixed to both the closet collar adapter 113 and the adapter plate 503 to promote a seal to prevent sewage gases from escaping as can be appreciated. In another embodiment, the sealing washer 119 may comprise a constant thickness and simply may be bent down around the upper surface of the closet collar adapter 113 to be affixed to the adapter plate 503.

Figure 18:
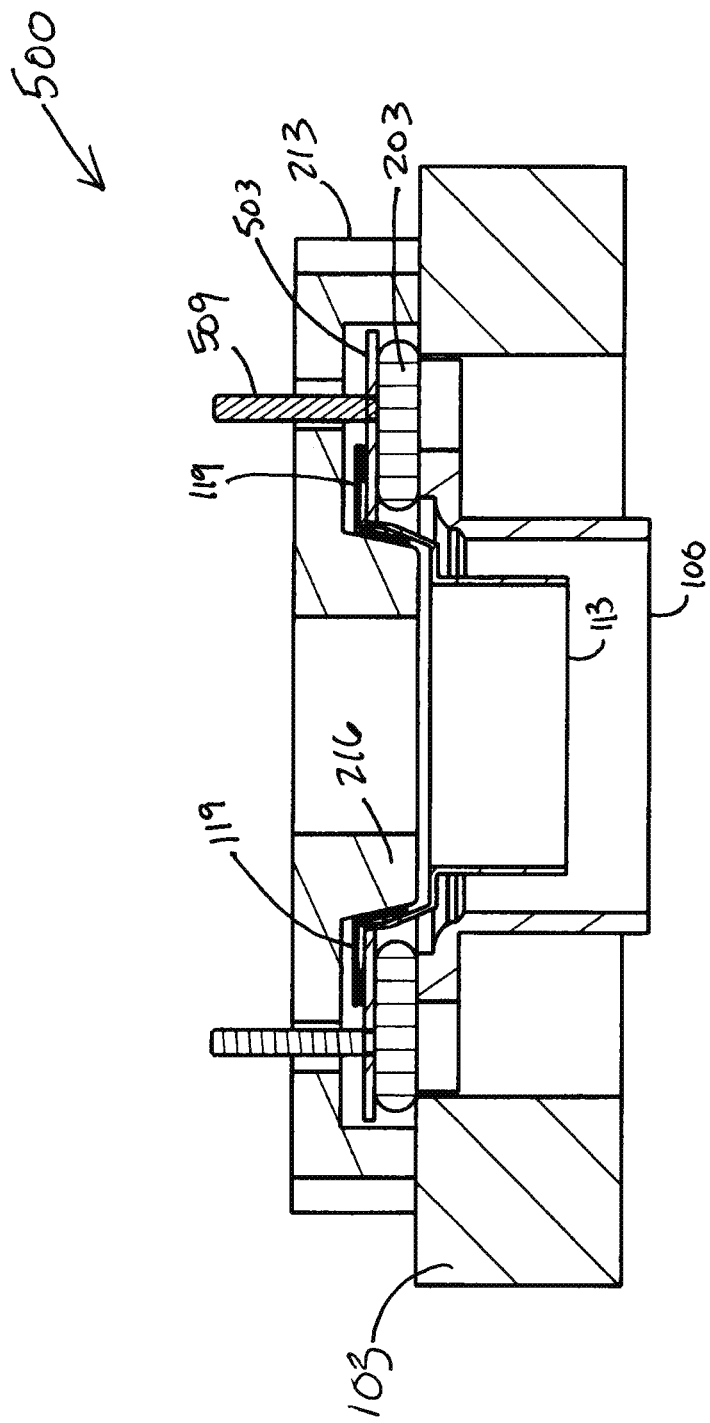
FIG. 18 is a drawing of an example of a toilet installed with a closet collar adaptation assembly according to various embodiments of the present disclosure.

With reference to FIG. 18, shown is the closet collar adaptation assembly 500 for which a toilet 213 has been installed over a closet collar 100. As shown, the sealing washer 119 makes contact with the horn 216 of the toilet 213. Additionally, the sealing washer 119 may be adhered to both the closet collar adapter 113 and the adapter plate 503 so as to prevent sewage gases from escaping through the junction of the closet collar adapter 113 and the adapter plate 503.

Figure 19:
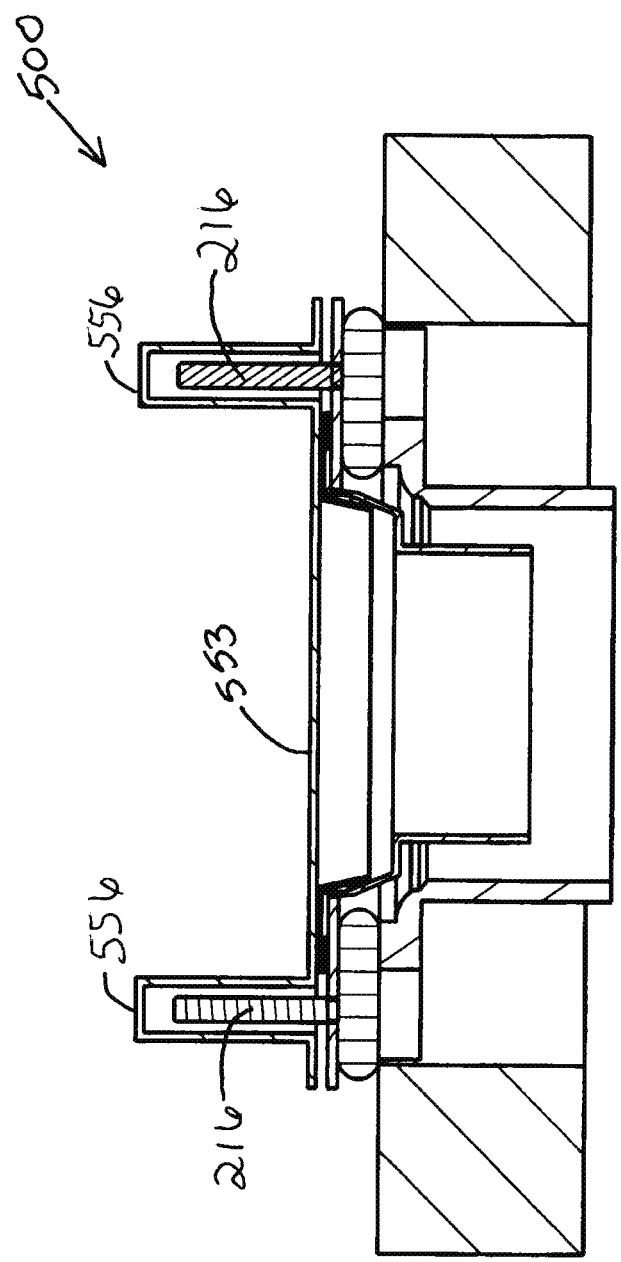
FIGS. 19-20 are drawings of a closet collar adaptation assembly with a lid according to various embodiments of the present disclosure.
Figure 20:
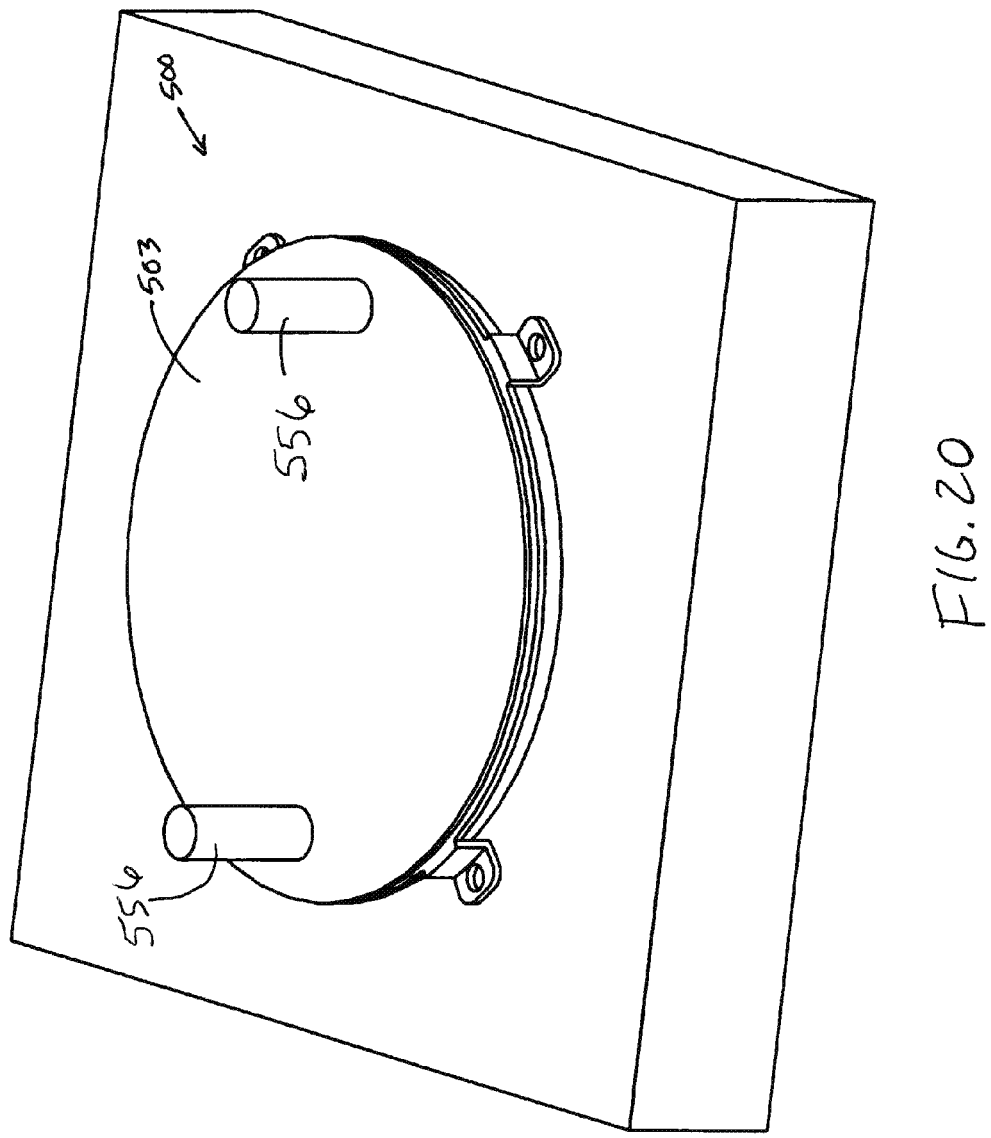

Referring to FIGS. 19 and 20, shown is the closet collar adaptation assembly 500 with a lid 553 positioned over the opening provided by the closet collar adaption assembly 500. The lid 553 may include protrusions 556 into which the anchor bolts 206 may insert to thereby facilitate the anchor bolts 206 coupling the lid 553 to the closet collar adaptation assembly 500. In some embodiments, the protrusions 556 may include internal teeth, ribs, and/or other features that may facilitate the anchor bolts 206 being restricted in the protrusions 556. The lid 553 being coupled to the closet collar adaptation assembly 500 may provide a seal over the closet collar 100.

Figure 21:
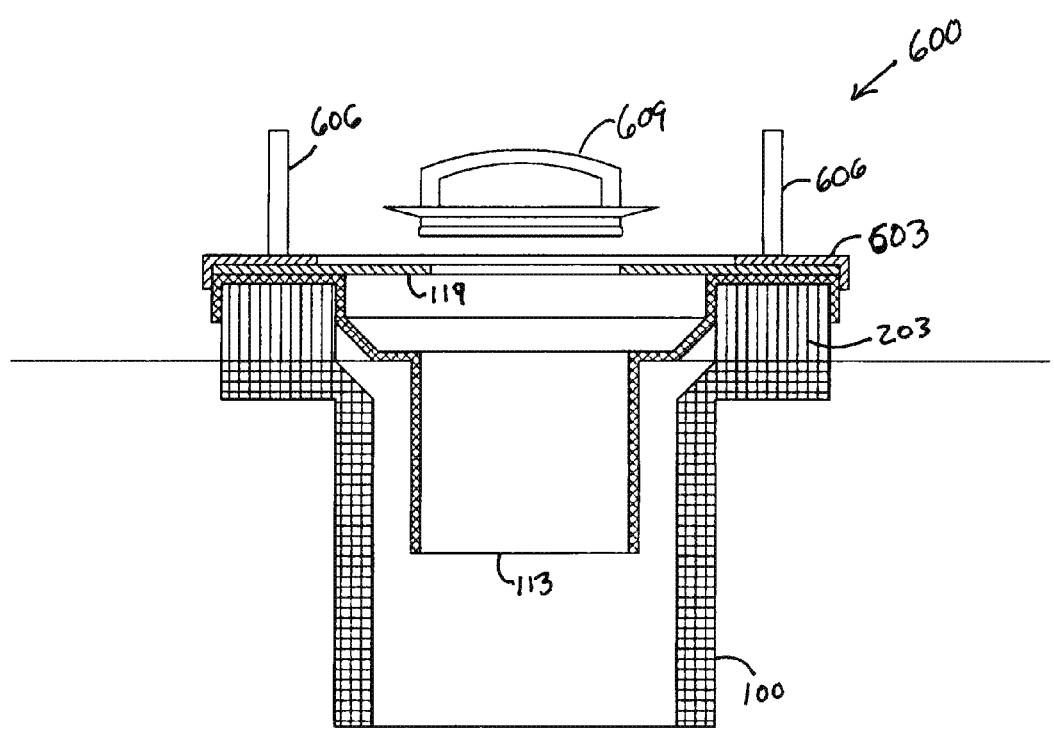
FIG. 21 is a drawing of another example of a closet collar adaptation assembly according to various embodiments of the present disclosure.

With reference to FIG. 21, shown is an example of the closet collar adaptation assembly 600 according to another embodiment of the present disclosure. As shown, the closet collar adaptation assembly 600 includes the closet collar adapter 113 that is positioned over the closet collar 100 with the flexible seal ring 203 disposed therebetween. As shown, the flexible seal ring 203 may provide a direct seal between the closet collar adapter 113 and the closet collar 100. The sealing washer 119 is disposed on the upper surface of the closet collar adapter 113. In addition, an adapter plate 603 is positioned above the sealing washer 119. The adapter plate 603 may be affixed to the sealing washer by, for example, an appropriate adhesive, fasteners, or any other suitable mechanism. Alternatively, the adapter plate 603 may simply be placed over the assembly as shown. The adapter plate 603 may include holes 513 (FIG. 15) and legs 506 (FIG. 15) that are not shown in the embodiment of FIG. 21. Bolts 606 extend from the upper surface of the adapter plate 603 in the present embodiment.

According to various embodiments, the closet collar adaptation assembly 600 may be advantageous in that there are fewer joints to seal to prevent sewage gases and other matter from escaping the joint between the toilet 213 (FIG. 3) and the closet collar 100. Specifically, the flexible seal ring 203 provides for sealing between the closet collar adapter 113 and the closet collar 100. Also, the sealing washer 119 is directly positioned on the upper surface of the closet collar adapter 113. This may provide greater surface area for a greater seal. Further, the adapter plate 603 may provide greater stability for all of the seals and may hold the entire closet collar adaptation assembly 600 in place over the closet collar 100 as can be appreciated.

In addition, a plug 609 may be provided that may be pushed into the hole presented by the sealing washer 119 to plug the hole over the closet collar 100. The plug 609 may prevent the escape of sewage gases when a toilet has not been installed. To this end, the plug 609 may be employed with any one of the embodiments of the various closet collar adaptation assemblies described herein.

Although the embodiment of FIG. 21 shows the components of the closet collar adaptation assembly 600 as being separate components, in alternative embodiments, one or more of the components of the adaptation assembly 600 may be integrally molded as a single component. In further alternative embodiments, one or more of the components of the closet collar adaptation assembly 600 may be bonded to form a single component using, for example, an overmolding process or any other suitable method. For example, the sealing washer 119, the closet collar adapter 113, and/or other components may be overmolded to the adapter plate 603 in various embodiments.

Figure 22A:
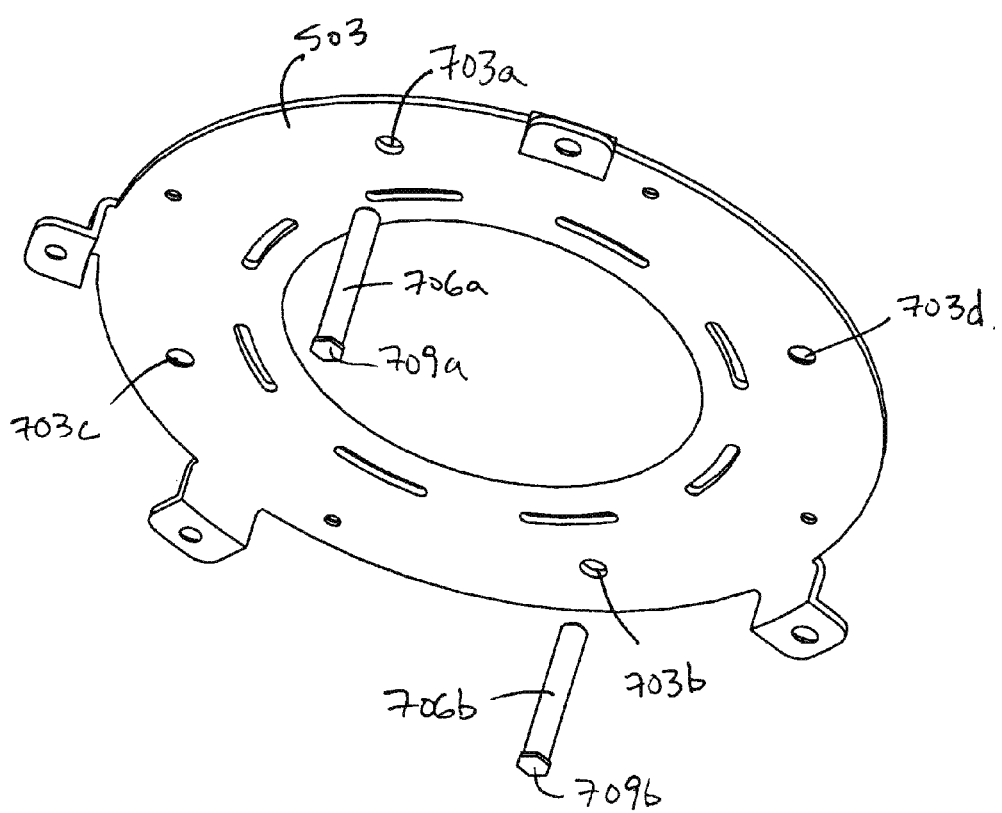
FIGS. 22A-22B are drawings of an example of an adapter plate for a closet collar adaptation assembly according to various embodiments of the present disclosure.
Figure 22B:
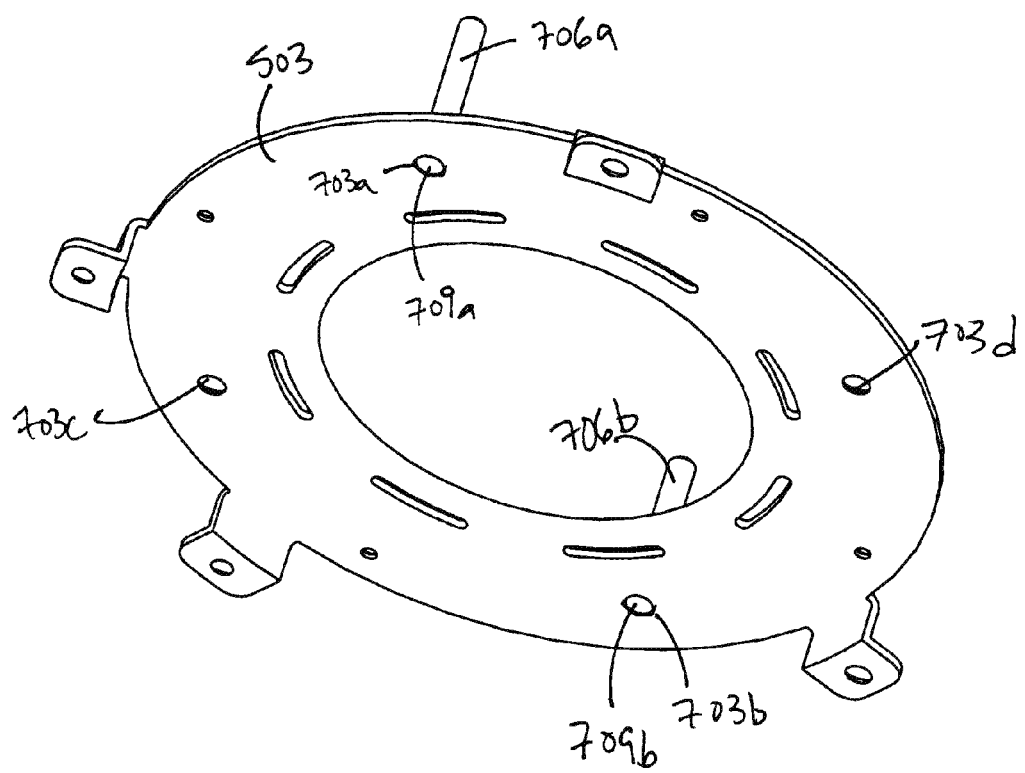
Figures 23A, 23B:
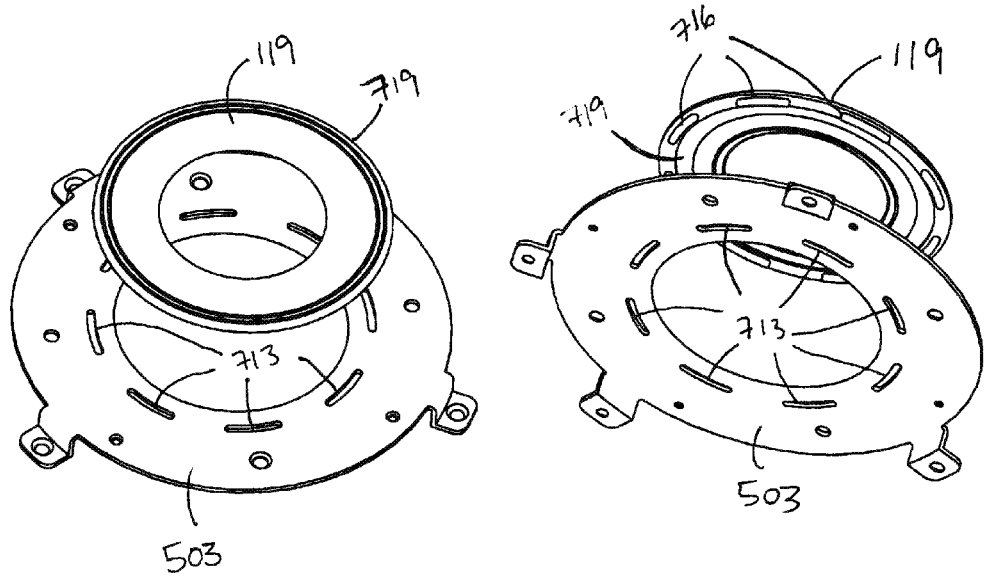

With reference to FIGS. 22A-22B, shown is the adapter plate 503 according to various embodiments. In the embodiment shown, the bolts 706a-706b are separate components from the adapter plate 503. The adapter plate 503 in FIGS. 22A-22B includes one or more holes 703a-703d to receive the bolts 706a-706b. The bolts 706a-706b may be passed into the corresponding holes 703a-703d so that the bolt heads 709a-709b may be flush with the adapter plate 503. A press fit, threads, or any other suitable type of mechanism may retain the bolts 706a-706b in the holes 703a-703d.

Turning now to FIGS. 23A-23D, shown is an interaction of the adapter plate 503 and the sealing washer 119 according to various embodiments. In the embodiment shown, the adapter plate 503 now includes one or more receptacles 713, and the sealing washer 119 includes corresponding protrusions 716. When the sealing washer 119 is seated on the adapter plate 503 during assembly, for example, the protrusions 716 of the sealing washer 119 may insert into the receptacles 713 of the adapter plate 503. Having the protrusions 716 fit in the receptacles 713 may facilitate a proper concentric alignment of the sealing washer 119 with respect to the adapter plate 503. As best shown in FIG. 23E, the sealing washer 119 may also include a lip 719 that provides a space to accommodate the closet collar adapter 113, as will be shown later.

Figure 24A:
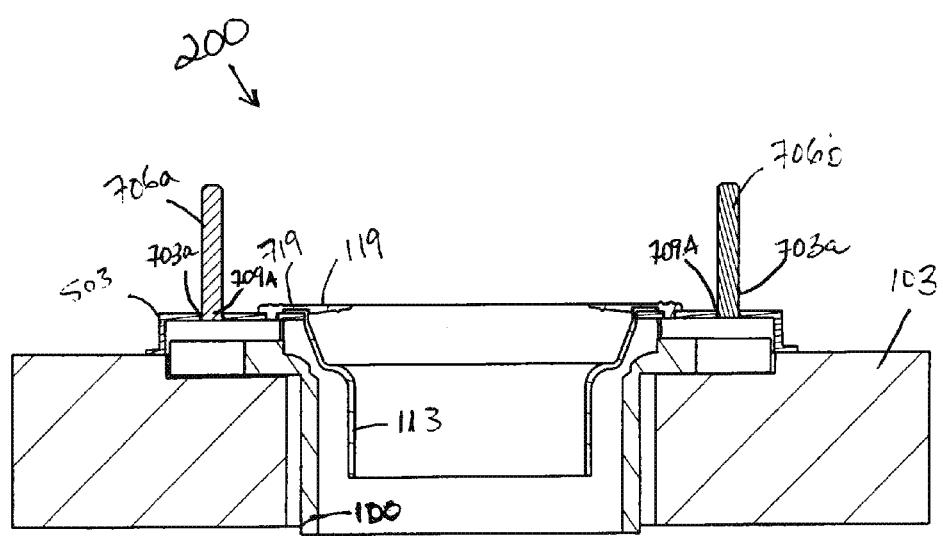
FIGS. 24A-24B are drawings showing another example of a closet collar adaptation assembly according to various embodiments of the present disclosure.

With reference to FIG. 24A, shown is the closet collar adaptation assembly 200 according to various embodiments. The closet collar adaptation assembly 200 may include the adapter plate 503, the closet collar adapter 113, the sealing washer 119, and potentially other components. The adapter plate 503 may be mounted to the surface of the flooring 103, and the closet collar adapter 113 may be seated on the adapter plate 503 as shown. Additionally, the sealing washer 119 may be seated on the closet collar adapter 113 and the adapter plate 503. A portion of the closet collar adapter 113 may also fit between the adapter plate 503 and the lip 719 of the sealing washer 119. By the protrusions 716 of the sealing washer 119 being inserted into the receptacles 713 of the adapter plate 503, proper concentric alignments of the adapter plate 503, the sealing washer 119, and the closet collar adapter 113 may be obtained. As shown in FIG. 24A, the bolts 706a-706b may pass through and be retained in the corresponding holes 703a-703b of the adapter plate 503 so that the bolt heads 709a-709b are flush with the adapter plate 503.

Figure 24B:
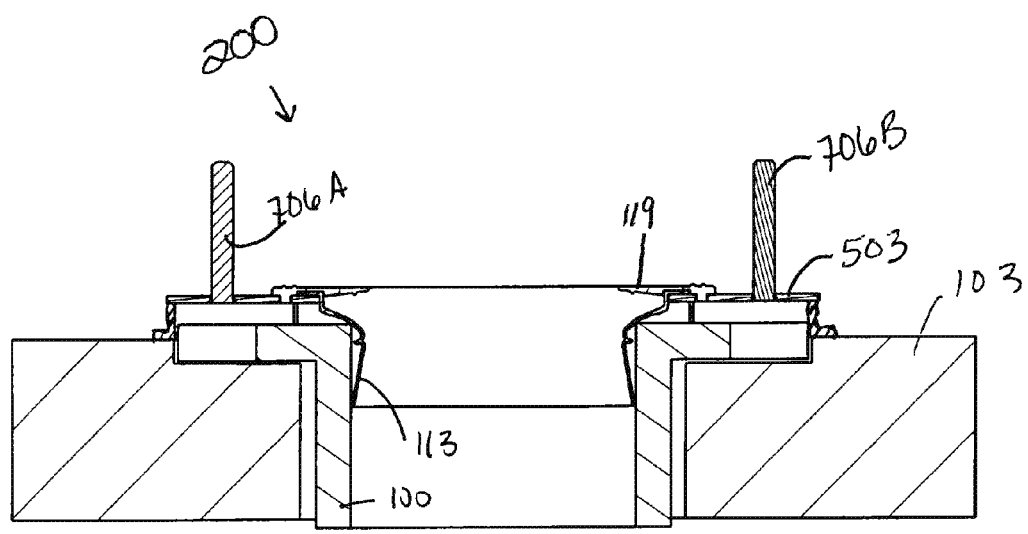

Turning to FIG. 24B, shown is the closet collar adaptation assembly 200 according to various embodiments. As shown in FIG. 24B, the closet collar adapter 113 may be flexible to accommodate various flooring 103, closet collar 100, and/or drain pipe geometries. To this end, the closet collar adapter 113 may comprise a neoprene, foam rubber, polyvinylchloride (PVC) rubber, thermoplastic elastomer (TPE), thermoplastic rubber (TPR), styrene-butadiene rubber (SBR), ethylene propylene diene monomer (EPDM) rubber, flexible PVC, or another type of suitable material. One or more of the components of the closet collar adaptation assembly 200, such as the closet collar adapter 113 and/or the sealing washer 119 may comprise an antimicrobial material, such as an integrated antimicrobial agent and/or an antimicrobial coating.

Further, one or more of the components of the closet collar adaptation assembly 200, such as the closet collar adapter 113 and/or the sealing washer 119, may be constructed using an overmolding process. The use of thermoplastic rubber flexible PVC, or thermoplastic elastomer may facilitate construction of the closet collar adapter 113 using injection molding processes. Additionally, one or more of the components of the closet collar adaptation assembly 200, such as the closet collar adapter 113 and/or the sealing washer 119 may be integrally molded as a single part according to various embodiments.

Figure 25A:
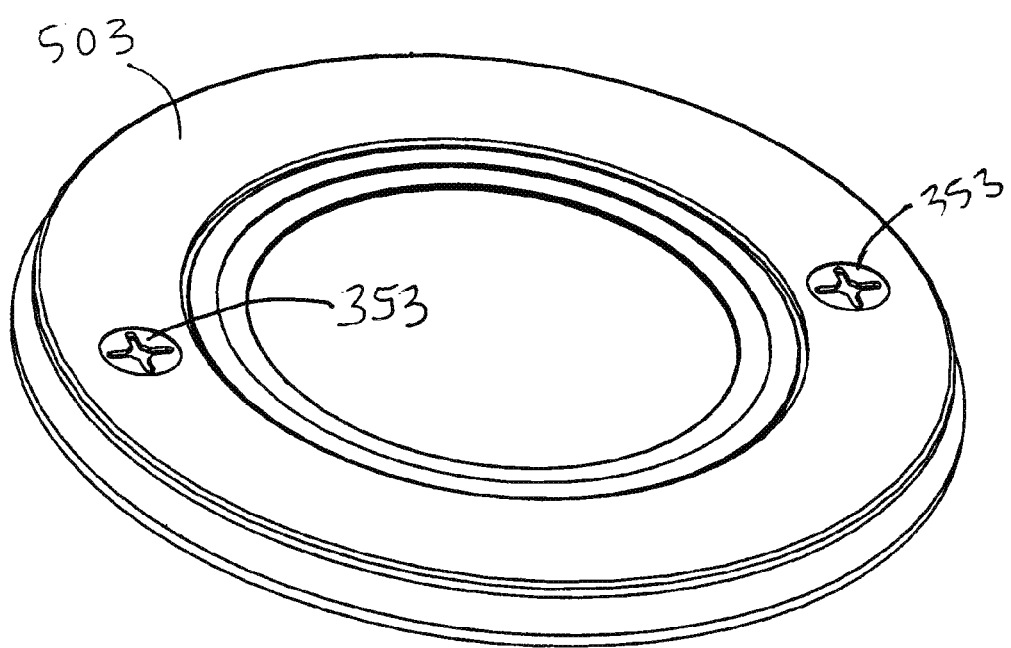
FIGS. 25A-25C are drawings showing examples of an adapter plate for a closet collar adaptation assembly according to various embodiments of the present disclosure.

Turning to FIG. 25A, shown is an alternative embodiment of the adapter plate 503 according to various embodiments. As shown, the clips 353 may be formed as part of the adapter plate 503. The clips 353 may also accept and retain the anchor bolts 206. The clips 353 in the present embodiment comprise mouths that may grip anchor bolts 206.

Figure 25B:
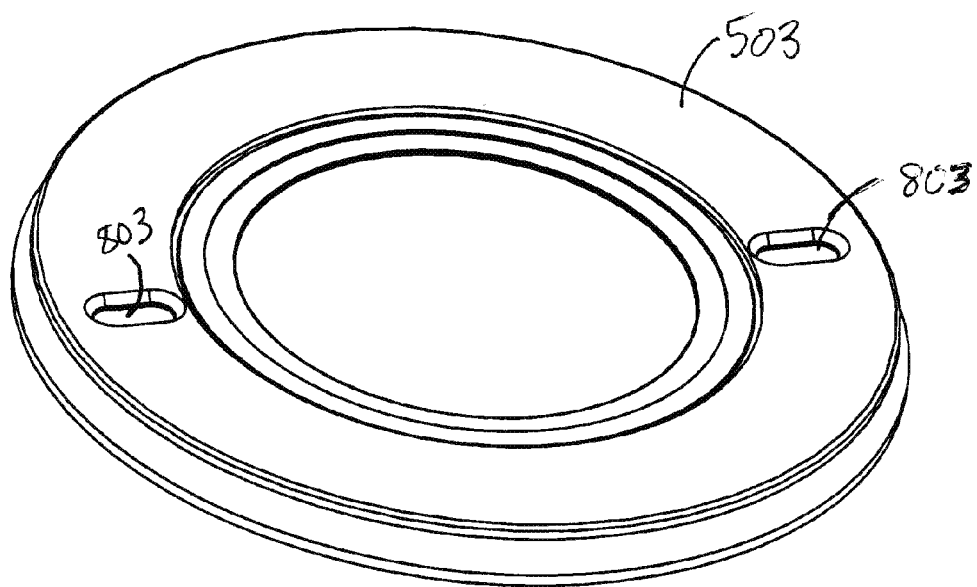

Referring now to FIG. 25B, shown is another embodiment of the adapter plate 503. In this embodiment, the adapter plate 503 includes elongated slots 803 that receive the anchor bolts 206 (FIG. 3). Because the slots 803 are elongated, the closet collar adapter 113 may accept anchor bolts 206 that are at various radial distances with respect to the center of the adapter plate 503.

Figure 25C:
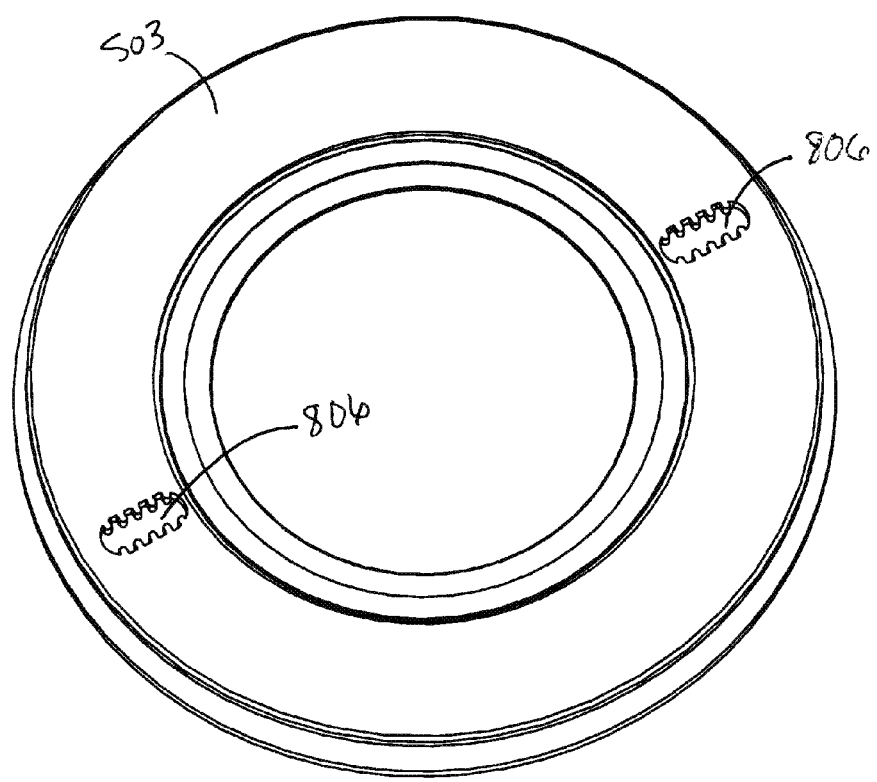

Turning to FIG. 25C, shown is another embodiment of the closet collar adapter 113. In the embodiment shown, elongated clips 806 are now formed as part of the closet collar adapter 113. The elongated clips 806 in the present example comprise teeth that may grip anchor bolts 206 (FIG. 3). The elongated clips 806 may accept and retain the anchor bolts 206 that are at various radial distances with respect to the center of the adapter plate 503.

Figure 26A:
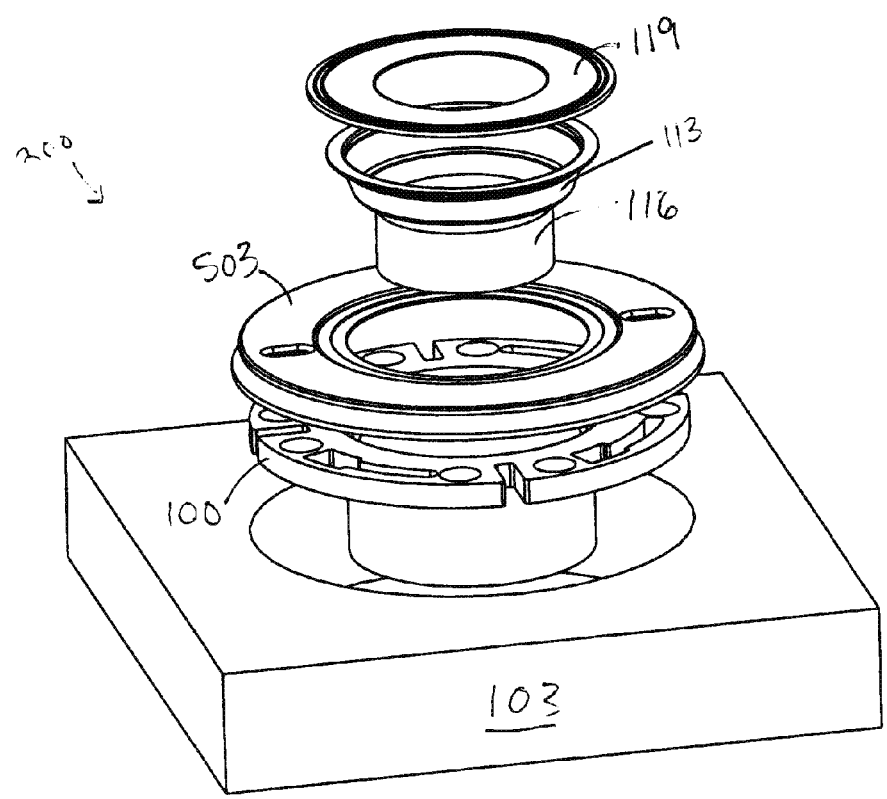
FIGS. 26A-26C are drawings showing examples of a closet collar adaptation assembly according to various embodiments of the present disclosure.
Figures 26B, 26C:
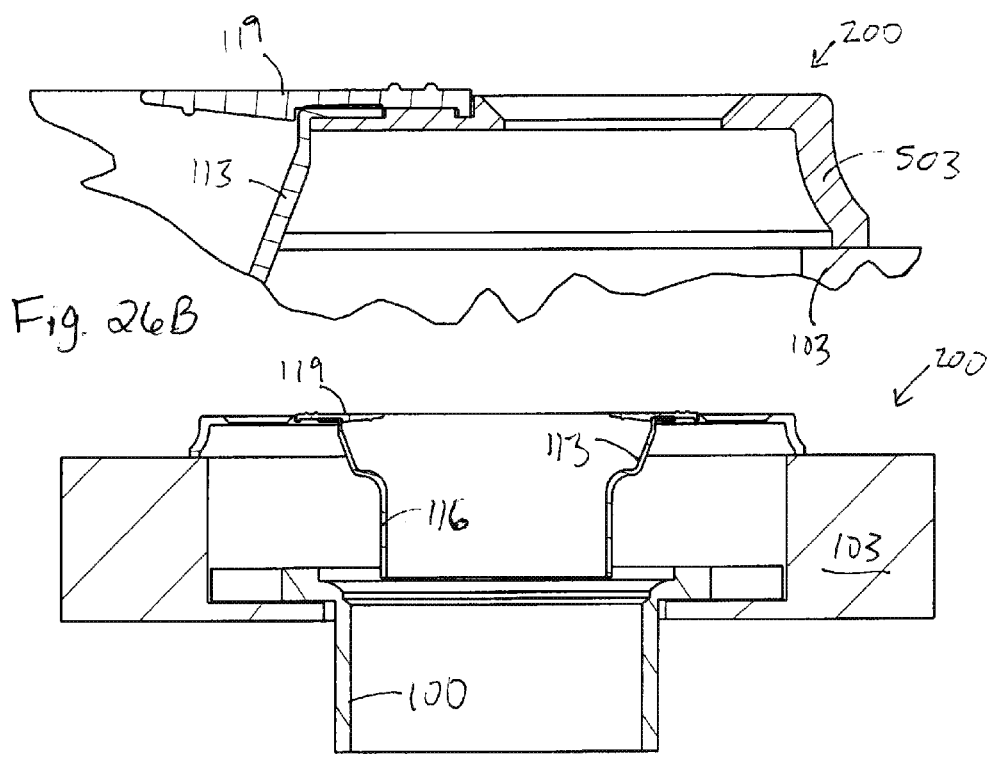

With reference to FIGS. 26A-26C, shown is the closet collar adaptation assembly 200 according to various embodiments. As shown, the adapter plate 503 may be seated on the flooring 103. Also, the closet collar adapter 113 may be seated between the sealing washer 119 and the adapter plate 503. The sealing washer 119 and/or the closet collar adapter 113 may be glued to the adapter plate 503, for example, during assembly of the closet collar adaptation assembly 200. Further, the sealing washer 119 and the closet collar adapter 113 may be glued together. In some embodiments, gluing the closet collar adapter 113 may be omitted, because the closet collar adapter 113 may be seated and retained between the sealing washer 119 and the adapter plate 503.

As best shown in FIG. 26C, the bottom opening of the pipe extension 116 for the closet collar adapter 113 is at a level that is lower than the top opening of the closet collar 100. Thus, wastes passing through the pipe extension 116 may pass from the closet collar adapter 113 through the closet collar 100.

Figure 27A:
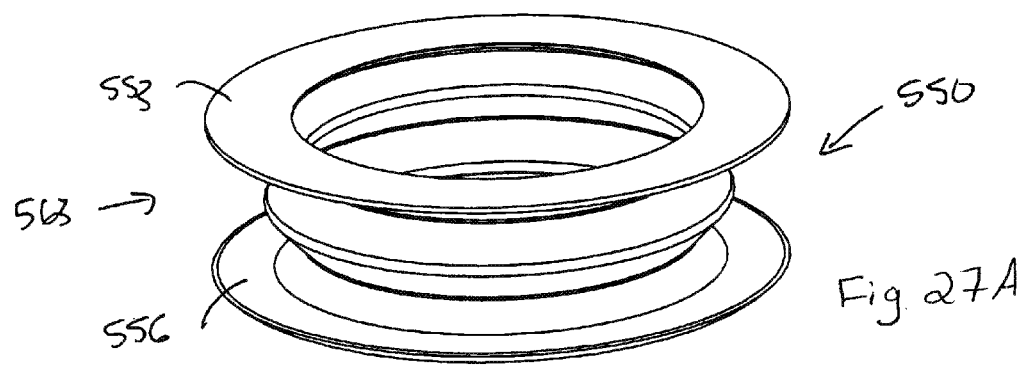
FIGS. 27A-27B are drawings showing an example of a bellow for a closet collar adaptation assembly according to various embodiments of the present disclosure.
Figure 27B:
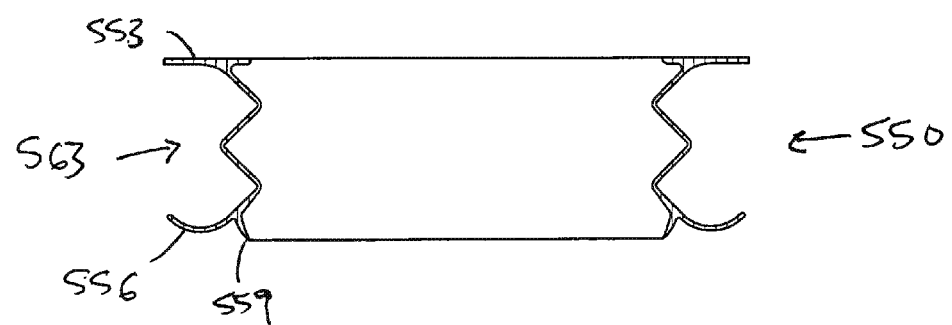

Turning now to FIGS. 27A-27B, shown is a bellow 550 according to various embodiments. The bellow 550 may include a first lip 553, a second lip 556, a ridge 559, and a collapsible portion 563. The bellow 550 may comprise a flexible material, such as flexible PVC, thermoplastic rubber, a thermoplastic elastomer, or any other type of material. In various embodiments, the bellow 550, sealing washer 119, closet collar adapter 113, the bellow 550, and/or other components may constructed using overmolding techniques. For example, these components may be overmolded to the adapter plate 503 using through-holes in the adapter plate 503 to facilitate a bond between the components.

Figure 27C:
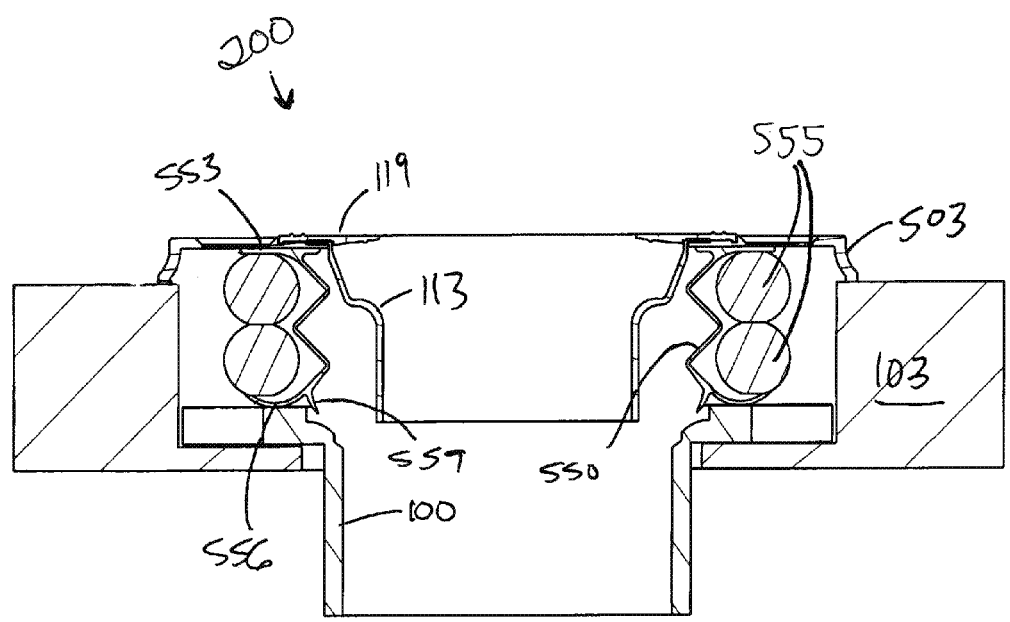
FIG. 27C is a drawing showing another example of a closet collar adaptation assembly according to various embodiments of the present disclosure.

With reference now to FIG. 27C, shown is the closet collar adaptation assembly 200 according to various embodiments. The closet collar adaptation assembly 200 includes the adapter plate 503 seated on the flooring 103. The sealing washer 119 may be seated on the adapter plate 503, and the closet collar adapter 113 may be seated between the adapter plate 503 and the sealing washer 119. Additionally, the bellow 550 may be disposed between the top of the closet collar 100 and the bottom of the adapter plate 503. In this sense, the first lip 553 of the bellow 550 may be in contact with the adapter plate 503, and the second lip 556 and the ridge 559 may be in contact with the closet collar 100. In some embodiments, an adhesive may be disposed on the first lip 553 and/or the second lip 556 to facilitate installation and/or a seal. Also, in various embodiments, the first lip 553 of the bellow may be overmolded to the adapter plate 503. Thus, the bellow 550 may act as a seal and thereby prevent liquids and/or gases from escaping from the closet collar adaptation assembly 200.

One or more of the flexible rings 555 may be located between the bellow 550 and the flooring 103. The flexible rings 555 may comprise rubber, foam, or any other type of material. Additionally, the flexible rings 555 may be compressible and thereby facilitate the closet collar adaptation assembly 200 being compatible with closet collars 100 that are at various heights with respect to the flooring 103.

Figure 28A:
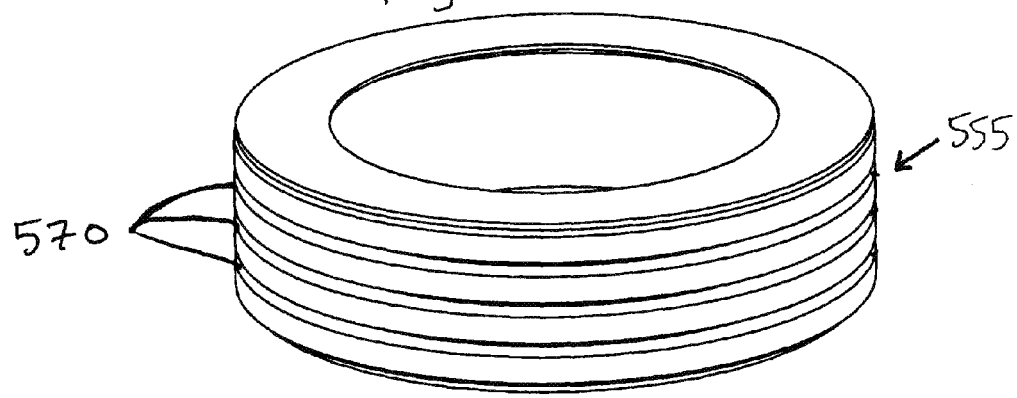

Turning now to FIG. 28A, shown is an alternative embodiment of the flexible ring 555 according to various embodiments. The flexible ring 555 may include one or more grooves 570, for example, along an exterior circumference of the flexible ring 555. The flexible ring 555 may be manufactured using an extrusion process or other type of process, and ends of the extruded material may be glued together in order to form the ring shape.

Figure 28B:
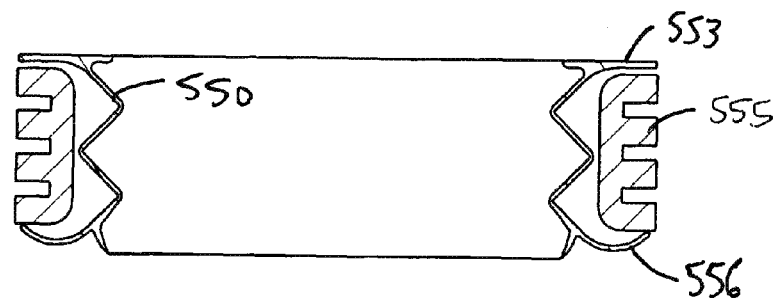

FIG. 28B shows an interaction of the flexible ring 555 of FIG. 28A with the bellow 550 according to various embodiments. The flexible ring 555 may be disposed between the first lip 553 and the second lip 556 of the bellow 550.

Figure 29A:
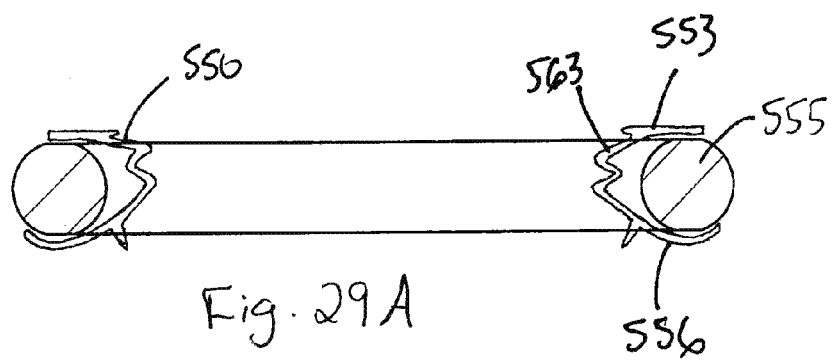

With reference to FIG. 29A, shown is an interaction of the bellow 550 with the flexible ring 555 according to various embodiments. In the embodiment shown, the flexible ring 555 has a circular cross-section. As shown, the collapsible portion 563 of the bellow 550 may at least partially collapse. Upon the collapsible portion 563 at least partially collapsing due to a force exerted, for example by the adapter plate 503, the first lip 553 and second lip 556 may be in contact with the flexible ring 555.

Figure 29B:
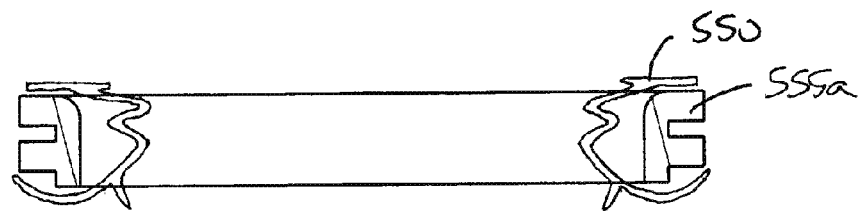

Turning now to FIG. 29B, shown is an interaction of the bellow 550 with the flexible ring 555 according to further embodiments. In this embodiment, the flexible ring 555, referred to herein as the flexible ring 555a, may be a portion that has been cut and removed from the flexible ring 555 shown in FIG. 28A.

With reference to FIG. 30A shown is an alternative embodiment of the flexible ring 555a. FIG. 30A shows multiple flexible rings 555, referred to herein as the flexible ring 555a and the flexible ring 555b. The flexible rings 555a-555b may be hollow according to various embodiments.

FIG. 30B shows an interaction of the flexible rings 555a-555b of FIG. 30A with the bellow 550 according to various embodiments. One or more flexible rings 555a-555b may be stacked to facilitate a proper seal between the closet collar adapter 113 (FIG. 24A) and the closet collar 100 (FIG. 24A) when the closet collar 100 is recessed in the flooring 103 (FIG. 24A).

With reference to FIGS. 30C-30D, shown is an alternative embodiment of the first flexible ring 555a and the second flexible ring 555b and their interactions with the bellow 550 according to various embodiments. As shown, the first flexible ring 555a and the second flexible ring 555b may be connected at a joint 575 and thus formed as a single component. A user, for example, may cut along the joint 575 to separate the first flexible ring 555a from the second flexible ring 555b.

Figure 31A:
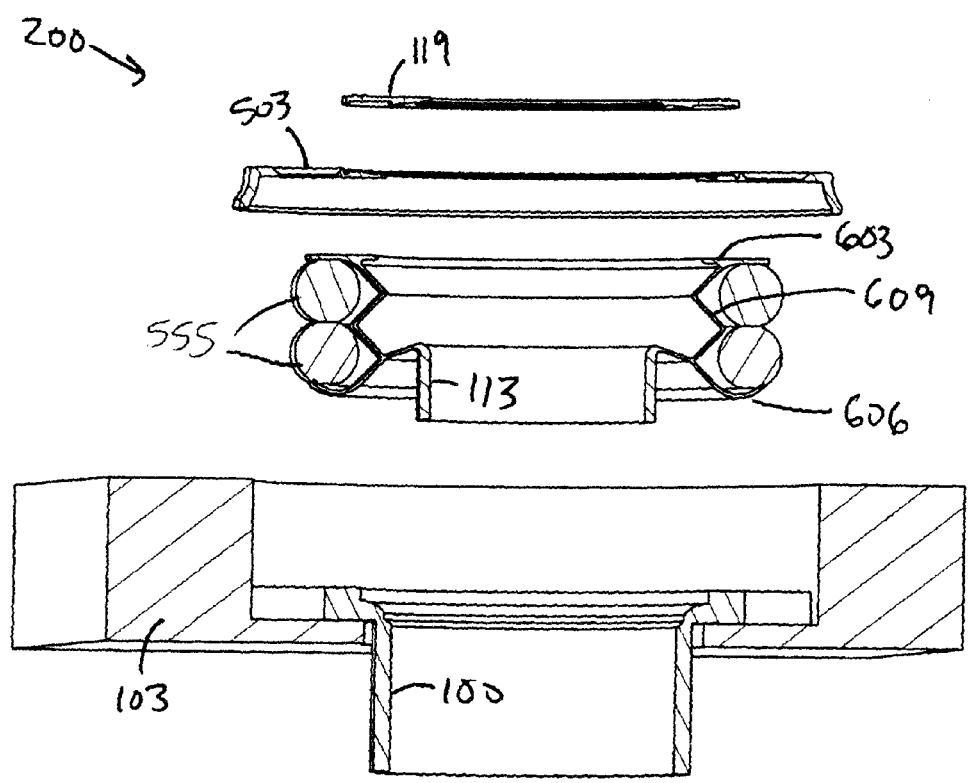
FIGS. 31A-31B and 32A-32C are drawings showing another example of a closet collar adaptation assembly according to various embodiments of the present disclosure.
Figure 31B:
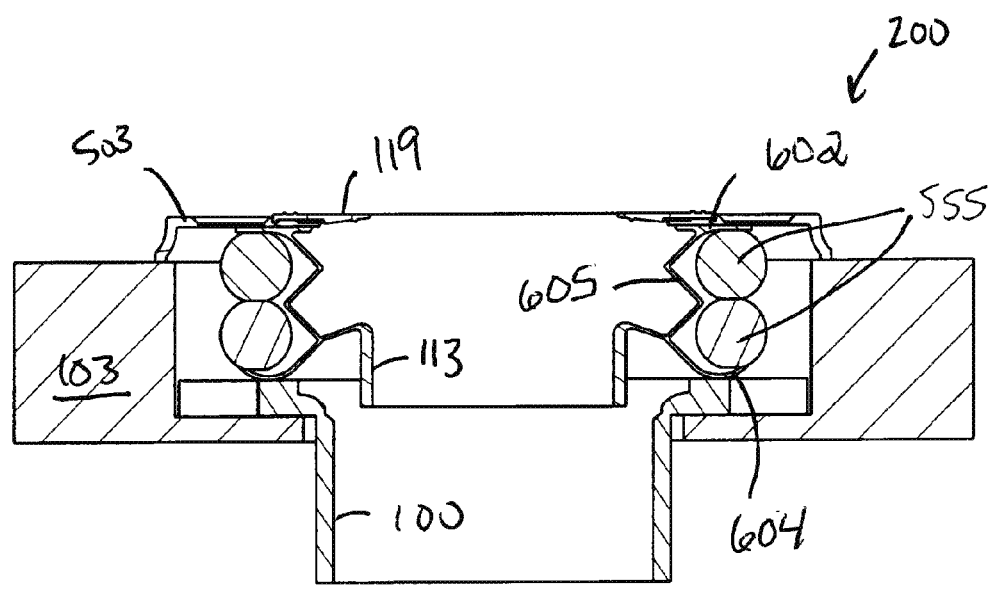

Referring to FIGS. 31A-31B, shown is an alternative embodiment of the closet collar adaptation assembly 200 according to various embodiments. In the embodiment shown, the closet collar adaptation assembly 200 includes the sealing washer 119, the adapter plate 503, one or more flexible rings 555, and the closet collar adapter 113. The closet collar adapter 113 in the embodiment shown may perform a similar function as the bellow 550 (FIG. 30A) discussed above. In particular, the closet collar adapter 113 in the present embodiment may act as a seal and thereby prevent liquids and/or gases from escaping from the closet collar adaptation assembly 200. To this end, the closet collar adapter 113 may include a first lip 602, a second lip 604, and a collapsible portion 605. As best shown in FIG. 31B, the first lip 602 may abut the adapter plate 503 and one of the flexible rings 555. Similarly, the second lip 604 may abut the closet collar 100 and one of the flexible rings 555. Thus, the closet collar adapter 113 may provide a seal and thereby prevent liquids and/or gases from escaping from the closet collar adaptation assembly 200.

In some embodiments, the first lip 602 may be positioned between the adapter plate 503 and the sealing washer 119. Also, some or all of the flexible components may be molded as a single component. For instance, all of the flexible components may be overmolded onto the adapter plate 503.

Figure 32A:
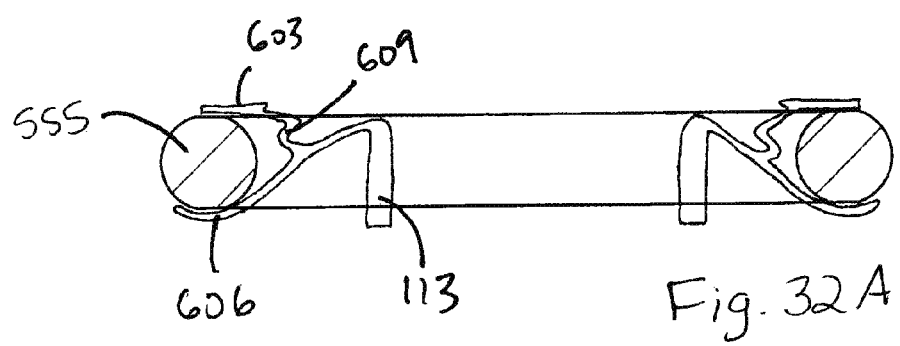

Referring to FIG. 32A, shown is an example of a portion of the closet collar adaptation assembly 200 of FIGS. 31A-31B for which a single flexible ring 555 is being used. As shown, the first lip 602 and the second lip 604 of the closet collar adapter 113 are in contact with the flexible ring 555, and the collapsible portion 605 of the closet collar adapter 113 is now at least partially collapsed.

Figure 32B:
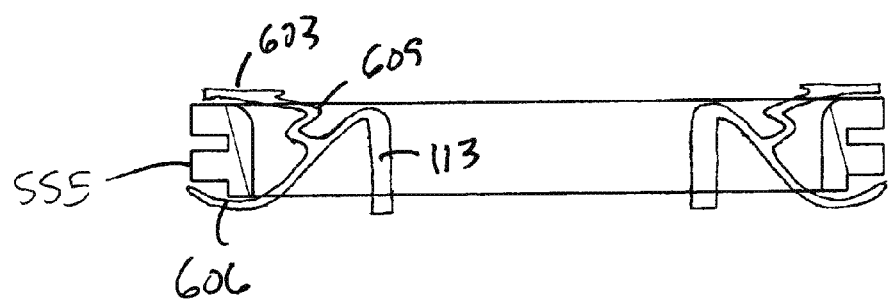

With reference to FIG. 32B, shown is an example of a portion of the closet collar adaptation assembly 200 of FIGS. 31A-31B according to various embodiments. In the present example, a portion of the flexible ring 555 of FIG. 28A is being used. As shown, the first lip 602 and the second lip 604 of the closet collar adapter 113 are in contact with the flexible ring 555, and the collapsible portion 605 of the closet collar adapter 113 is now at least partially collapsed.

Figure 32C:
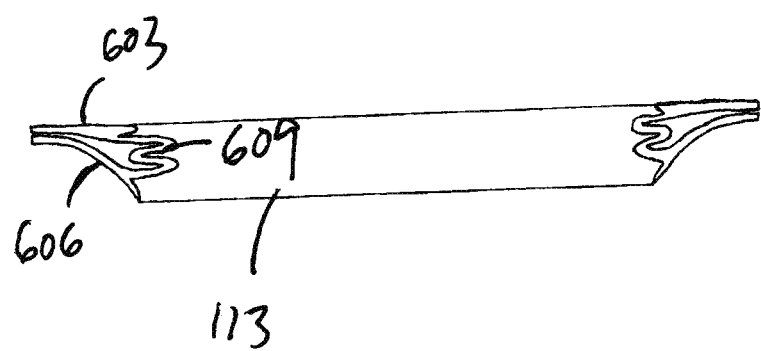

Referring to FIG. 32C, shown is an example of a portion of the closet collar adaptation assembly 200 of FIGS. 31A-31B for the case in which a flexible ring 555 (FIG. 32B) is not used. As shown, the collapsible portion 605 of the closet collar adapter 113 has partially collapsed to an extent that is even greater than as shown in FIGS. 32B-32C.

Figure 33A:
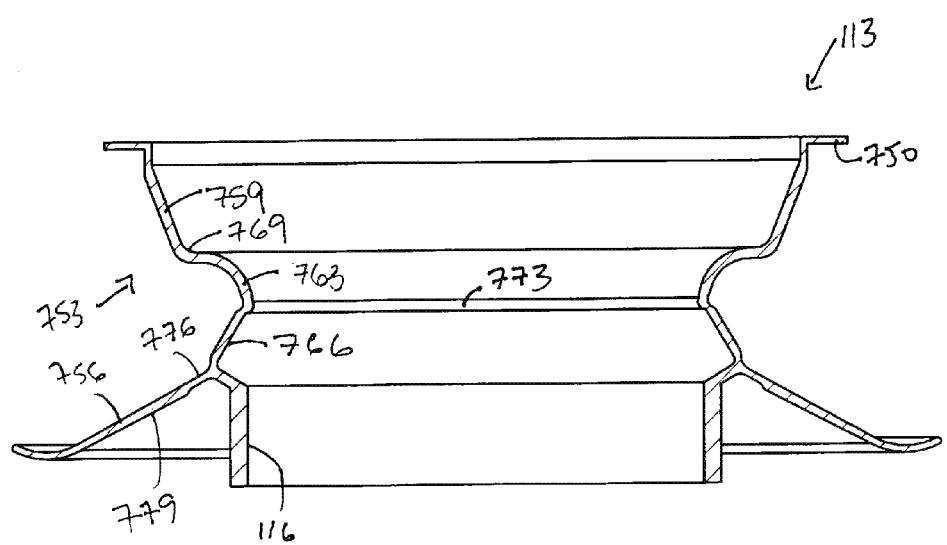
FIGS. 33A-33E are drawings showing another example of a closet collar adapter for a closet collar adaptation assembly according to various embodiments of the present disclosure.
Figure 33B:
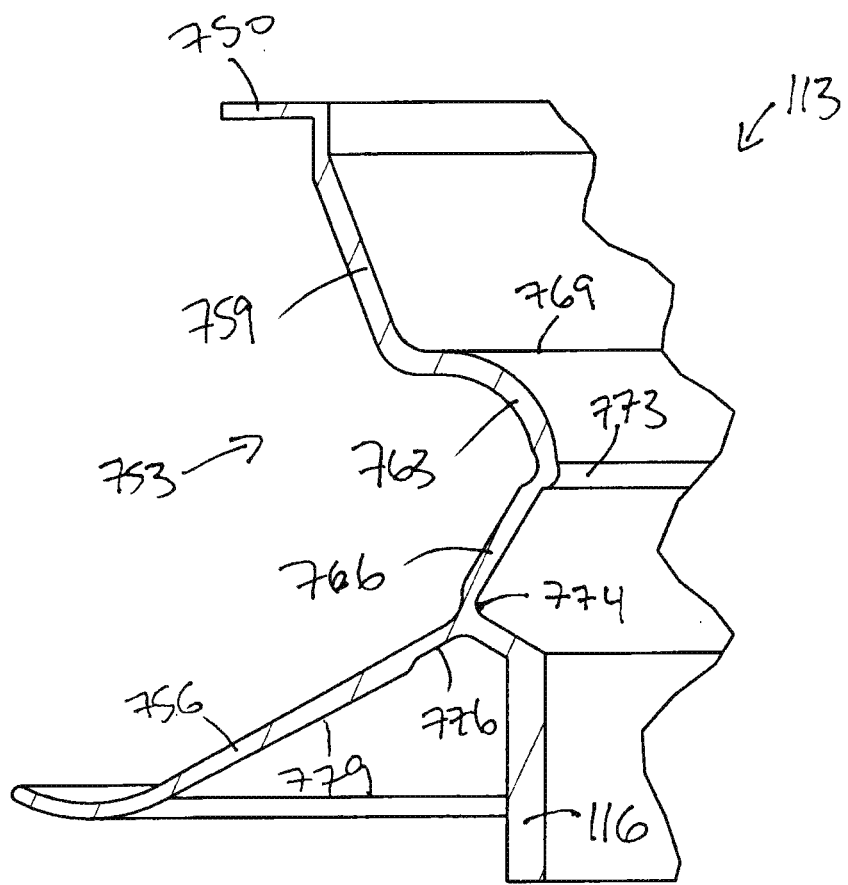

With reference now to FIGS. 33A-33B, shown is another example of a closet collar adapter 113 according to various embodiments. The closet collar adapter 113 shown may include a lip 750, a collapsible portion 753, a base 756, and the pipe extension 116. The collapsible portion 753 may further include a first portion 759, a second portion 763, and a third portion 766 of the closet collar adapter 113. A first edge 769 may connect the first portion 759 and the second portion 763 of the collapsible portion 753. Further, a second edge 773 may connect the second portion 763 and the third portion 766 of the collapsible portion 753 of the closet collar adapter 113. Additionally, a third edge 774 may connect the third portion 766 of the collapsible portion 753 to the base 756.

The first portion 759 of the collapsible portion 753 of the closet collar adapter 113 may have a wall thickness that is greater than the wall thickness of the second portion 763 and the third portion 766 of the collapsible portion 753. Additionally, the second edge 773 may be recessed inward with respect to the closet collar adapter 113. The base 756 may further include a first portion 776 and a second portion 779. The wall for the first portion 776 of the base 756 may be thinner than the wall for the second portion 779 of the base.

Figure 33C:
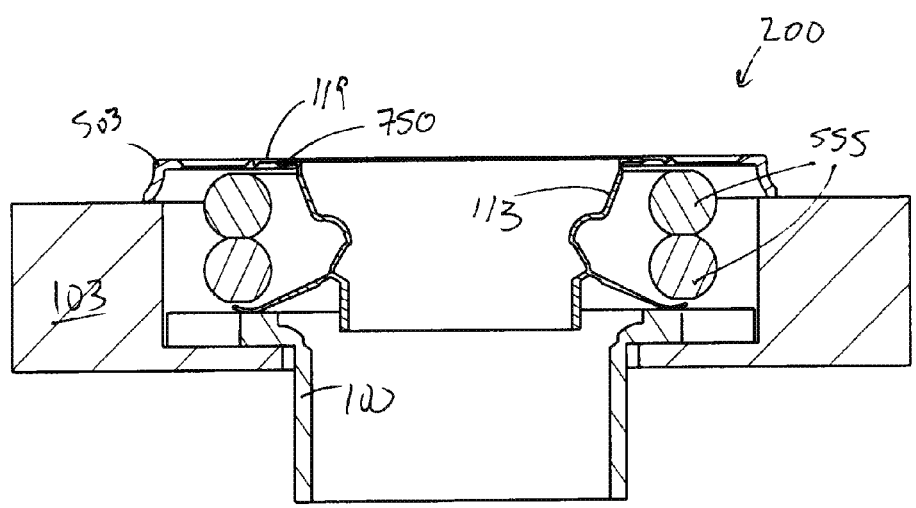

Turning to FIG. 33C, shown is another embodiment of the closet collar adaptation assembly 200 for which the closet collar adapter 113 of FIG. 33A is being used. As shown, the lip 750 of the closet collar adapter 113 may be disposed between the sealing washer 119 and the adapter plate 503. The base 756 of the closet collar adapter may be seated on the closet collar 100. One or more flexible rings 555 may be disposed between the closet collar adapter 113 and the flooring 103 as shown.

Figure 33D:
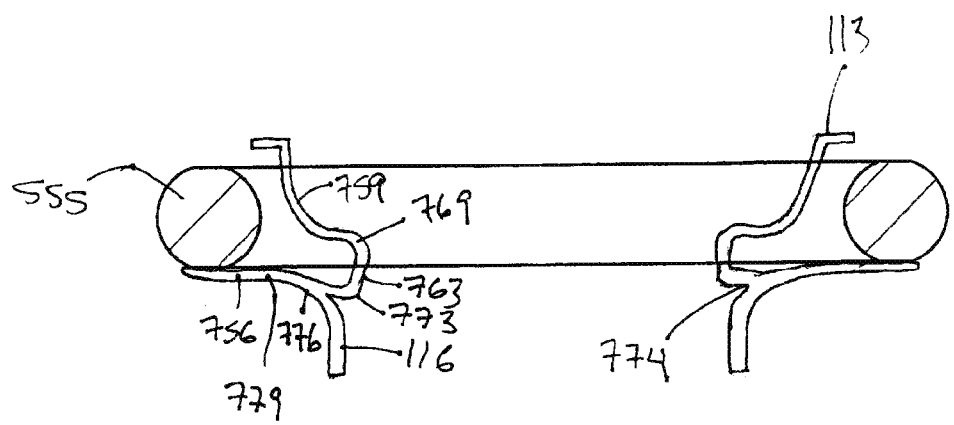

With reference to FIG. 33D, shown is a portion of the closet collar adaptation assembly 200 of FIG. 33B for the case in which a single flexible ring 555 is being used. As shown, the collapsible portion 753 of the closet collar adapter 113 has partially collapsed. In particular, the first portion 776 of the base 756 may flex and thereby facilitate the base 756 displacing downward. Additionally, the third edge 774 of the collapsible portion 753 may flex and facilitate the third portion 766 of the collapsible portion 753 displacing downward. Thus, a vertical distance between the third edge 774 and the second edge 773 may decrease.

The second portion 763 of the collapsible portion 753 may extend inward and downward by flexing about the second edge 773 and the first edge 769. As such, a vertical distance between the first edge 769 and the second edge 773 may decrease. Additionally, the first edge 769 may flex and facilitate the lip 750 and the first portion of the collapsible portion 753 displacing downward.

Figure 33E:
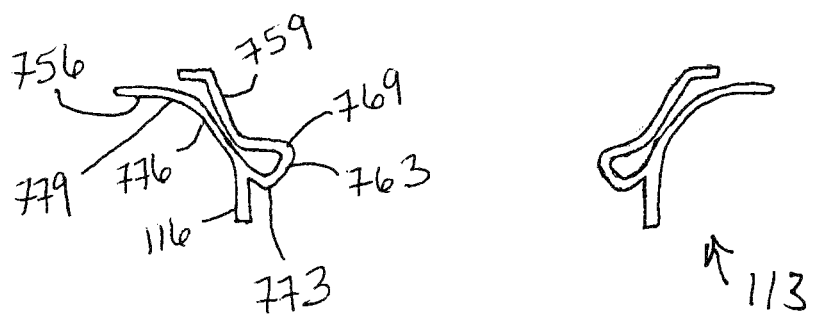

Turning now to FIG. 33E, shown is a portion of the closet collar adapter 113 collapsed, for example, in the event that a flexible ring 555 (33D) is not being used in conjunction with the closet collar adaptation assembly 200 (FIG. 33D).

It is emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure.

Therefore, the following is claimed:

1. An apparatus comprising:
    an annular collapsible portion;
    a lower lip extending radially outward from a first end of the annular collapsible portion, the lower lip configured to contact a closet collar;
    an upper lip extending radially outward from a second end of the annular collapsible portion, the upper lip configured to be positioned under a bottom surface of a toilet;
    a ridge extending from the annular collapsible portion configured to extend into the closet collar, wherein the annular collapsible portion, the lower lip, the upper lip, and the ridge are formed of a unitary structure; and at least one flexible ring located in a recessed channel bordered by the lower lip, the upper lip, and the annular collapsible portion.

2. The apparatus of claim 1, wherein the at least one flexible ring further comprises a plurality of flexible rings.

3. The apparatus of claim 1, wherein the at least one flexible ring comprises a foam.

4. The apparatus of claim 1, wherein the at least one flexible ring is compressible.

5. The apparatus of claim 1, wherein the annular collapsible portion, the lower lip, the upper lip, the ridge, and the at least one flexible ring form a closet collar adaptation assembly that is compatible with a plurality of possible closet collars disposed at varying heights relative to a flooring.

6. A closet collar adaptation assembly, comprising:
- an annular collapsible portion configured to fit a plurality of gap sizes between a toilet and a closet collar;
- a lower lip extending radially outward from a first end of the annular collapsible portion, the lower lip configured to contact the closet collar;
- an upper lip extending radially outward from a second end of the annular collapsible portion, the upper lip configured to be positioned under a bottom surface of the toilet;
- a ridge extending from the annular collapsible portion configured to extend into the closet collar, where the annular collapsible portion, the lower lip, the upper lip, and the ridge are formed of a unitary structure; and
- at least one flexible ring located between the lower lip and the upper lip.

7. The closet collar adaptation assembly of claim 6, wherein the at least one flexible ring further comprises a plurality of flexible rings.

8. The closet collar adaptation assembly of claim 6, wherein the at least one flexible ring comprises a foam.

9. The closet collar adaptation assembly of claim 6, wherein the at least one flexible ring is compressible.

10. The closet collar adaptation assembly of claim 6, wherein the closet collar adaptation assembly is compatible with a plurality of possible closet collars disposed at varying heights relative with a flooring.

11. A method, comprising:
- positioning a closet collar adaptation assembly onto a closet collar, wherein the closet collar adaptation assembly comprises:
  - an annular collapsible portion;
  - an upper lip extending radially outward from a first end of the annular collapsible portion, wherein the upper lip is configured to be positioned under a bottom surface of a toilet;
  - a lower lip extending radially outward from a second end of the annular collapsible portion, wherein the lower lip is configured to contact the closet collar;
  - a ridge extending from the annular collapsible portion; and
  - at least one flexible ring positioned between the upper lip and the lower lip; and
- positioning the toilet above the closet collar adaptation assembly.

12. The method of claim 11, further comprising extending the ridge into the closet collar when the lower lip is placed in contact with the closet collar.

13. The method of claim 11, further comprising compressing the at least one flexible ring between the upper lip and the lower lip.

14. An apparatus comprising:
- an annular collapsible portion;
- a lower lip extending radially outward from a first end of the annular collapsible portion, the lower lip configured to contact a closet collar;
- an upper lip extending radially outward from a second end of the annular collapsible portion, the upper lip configured to be positioned under a bottom surface of a toilet;
- a ridge extending from the annular collapsible portion configured to extend into the closet collar; and
- at least one flexible ring located in a recessed channel bordered by the lower lip, the upper lip, and the annular collapsible portion.

15. The apparatus of claim 14, wherein the annular collapsible portion, the lower lip, the upper lip, the ridge, and the at least one flexible ring form a closet collar adaptation assembly that is compatible with a plurality of closet collars disposed at varying heights relative to a flooring.

* * * * *